United States Patent
Sawai et al.

(10) Patent No.: US 7,974,959 B2
(45) Date of Patent: Jul. 5, 2011

(54) MAP UPDATE DATA SUPPLYING APPARATUS, VERSION TABLE, MAP DATA UPDATING SYSTEM, AND MAP UPDATE DATA SUPPLYING METHOD

(75) Inventors: Kimiyoshi Sawai, Okazaki (JP); Hironobu Sugimoto, Toyota (JP); Tomoki Kodan, Nagoya (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 329 days.

(21) Appl. No.: 12/309,851

(22) PCT Filed: Sep. 27, 2007

(86) PCT No.: PCT/JP2007/069424
§ 371 (c)(1), (2), (4) Date: Feb. 19, 2009

(87) PCT Pub. No.: WO2008/044584
PCT Pub. Date: Apr. 17, 2008

(65) Prior Publication Data
US 2009/0248758 A1 Oct. 1, 2009

(30) Foreign Application Priority Data
Sep. 29, 2006 (JP) .................... 2006-269313

(51) Int. Cl.
*G06F 7/00* (2006.01)
(52) U.S. Cl. ........ 707/695; 707/758; 707/802; 701/200; 717/169

(58) Field of Classification Search ........... 707/999.104, 707/999.203, 695, 758, 802; 701/200, 208; 717/169
See application file for complete search history.

(56) References Cited

U.S. PATENT DOCUMENTS

| | | | |
|---|---|---|---|
| 6,889,134 B2 * | 5/2005 | Nakane et al. | 701/202 |
| 2002/0091485 A1 | 7/2002 | Mikuriya et al. | |
| 2003/0220735 A1 | 11/2003 | Nimura | |
| 2004/0193370 A1 * | 9/2004 | Umezu et al. | 701/210 |
| 2006/0167934 A1 * | 7/2006 | Nomura | 707/104.1 |

FOREIGN PATENT DOCUMENTS

JP   A 2004-178248   6/2004

* cited by examiner

*Primary Examiner* — Hosain T Alam
*Assistant Examiner* — Jieying Tang
(74) *Attorney, Agent, or Firm* — Oliff & Berridge, PLC

(57) ABSTRACT

Map updating systems, methods, and programs that extract update requiring sections with respect to an update requesting section that is one of the sections being a target of an update request requesting that the target map data should be updated, obtain the information related to the guaranty versions respectively corresponding to the extracted update requiring sections by referring to the version table, the update requiring sections each being one of the sections that needs to be updated in order to guarantee integrity between the sections that are positioned adjacent to each other after the update requesting section has been updated, and generate, based on the update-purpose map database, one of the update data files regarding the update requesting section as well as other ones of the update data files regarding the update requiring sections and having the update versions indicated as the guaranty versions.

10 Claims, 10 Drawing Sheets

FIG. 5

| VERSION TABLE | | | |
|---|---|---|---|
| SECTION GROUP | | GUARANTY VERSION | |
| SECTION 7 | SECTION 8 | 2 | |
| | SECTION 12 | 5 | |
| SECTION 8 | SECTION 7 | 2 | |
| SECTION 9 | SECTION 14 | 5 | |
| SECTION 12 | SECTION 7 | 5 | |
| | SECTION 13 | 5 | |
| SECTION 13 | SECTION 12 | 5 | |
| | SECTION 14 | 3 | |
| | SECTION 18 | 4 | |
| SECTION 14 | SECTION 9 | 5 | |
| | SECTION 13 | 3 | |
| | SECTION 19 | 2 | |
| SECTION 18 | SECTION 13 | 4 | |
| | SECTION 23 | 4 | |
| SECTION 19 | SECTION 14 | 2 | |
| | SECTION 20 | 4 | |
| SECTION 20 | SECTION 19 | 4 | |
| SECTION 23 | SECTION 18 | 4 | |
| | SECTION 24 | 6 | |
| SECTION 24 | SECTION 23 | 6 | |

VT g, va

MAP UPDATE DATA SUPPLYING APPARATUS, VERSION TABLE, MAP DATA UPDATING SYSTEM, AND MAP UPDATE DATA SUPPLYING METHOD

INCORPORATION BY REFERENCE

This application is a National Phase of International Patent Application No. PCT/JP2007/069424, filed Sep. 27, 2007, which claims priority of Japanese Patent Application No. 2006-269313, filed Sep. 29, 2006. The disclosures of these applications are incorporated herein by reference in their entirety.

BACKGROUND

1. Related Technical Fields

Related technical fields include map update data supplying apparatuses, methods and programs that supply update data files used for updating target map data, such as navigation-purpose map data used by, for example, a navigation apparatus, versions tables used by the map update data supplying apparatuses, as well as map data updating systems in which the map update data supplying apparatuses are used.

2. Related Art

Techniques used for updating a part of the contents of map data, such as road maps used by a navigation apparatus, are conventionally known. For example, an apparatus disclosed in Japanese Patent Application Publication No. JP-A-2004-178248 (Patent Document 1) includes a data group table that stores a series of link numbers that constitute a road that has been newly built so that, with regard to the newly-built road, data up to a portion at which the newly-built road joins an existing trunk road can be stored as a data group. When a navigation apparatus has requested that one of a plurality of sections into which the map data is divided into should be updated, in a case where the newly-built road stored in the data group table extends to the outside of the section for which the update request has been made, the apparatus refers to the data group table and supplies update information for the entirety of the newly-built road to the navigation apparatus.

With this arrangement, even if the update information regarding only the part of the sections of the map data that has been specified by the navigation apparatus is supplied, it is possible to avoid the situation where the road in the map is cut off at the border between the part of the sections and the sections positioned adjacent thereto. Accordingly, even after the part of the sections has been updated, it is possible to conduct an appropriate route search. In addition, it is possible to make the appearance of the displayed map better.

SUMMARY

With the apparatus disclosed in Patent Document 1 listed above, the data group table is configured so as to store therein the series of link numbers that constitute the newly-built road. Thus, in a case where a large number of roads have been newly built or in a case where the length of each newly-built road is long, a large number of pieces of information such as the link numbers need to be registered into the data group table. As a result, a problem arises where the data amount of the data group table becomes large.

In addition, because the data group table is configured so as to store therein the series of link numbers that constitute the newly-built road, in a case where an existing road has been changed in relation to the newly-built road, in a section that is different from the section for which the update request has been made, a problem arises where it is not possible to appropriately update then changed portion. As a result, there is a problematic possibility where it is not possible to make a proper connection relationship between the newly-built road and the existing road, and it is therefore not be possible to conduct an appropriate route search.

Various exemplary implementations of the broad principles described herein provide a map update data supplying apparatus, and a version table used by such a map update data supplying apparatus, as well as a map data updating system in which the a map update data supplying apparatus is used and a map update data supplying method that is (i) able to, when update data files used for updating target map data being an update target are supplied, keep the data amount of the update data files to a small level, while guaranteeing the integrity between the sections that are positioned adjacent to each other even after an update requesting section has been updated, and also (ii) able to keep the data amount of a data table used for realizing the update to a small level.

Various exemplary implementations provide systems, methods, and programs that supply update data files used for updating target map data being a target of an update. The systems, methods, and programs include a plurality of update versions of update-purpose map data, each update version of update-purpose map data being divided into a plurality of sections. The systems, methods, and programs include information related to guaranty versions in correspondence with section groups, each of the section groups being a set made up of a different one of the sections in the update-purpose map data and another section that is positioned adjacent thereto, and each of the guaranty versions being an oldest update version that is able to guarantee integrity between the sections that constitute a corresponding one of the section groups. The systems, methods, and programs extract update requiring sections with respect to an update requesting section that is one of the sections being a target of an update request requesting that the target map data should be extract update requiring sections with respect to an update requesting section that is one of the sections being a target of an update request requesting that the target map data should be updated. The systems, methods, and programs obtain the information related to the guaranty versions respectively corresponding to the extracted update requiring sections by referring to the version table, the update requiring sections each being one of the sections that needs to be updated in order to guarantee integrity between the sections that are positioned adjacent to each other after the update requesting section has been updated. The systems, methods, and programs generate, based on the update-purpose map database, one of the update data files regarding the update requesting section as well as other ones of the update data files regarding the update requiring sections and having the update versions indicated as the guaranty versions.

BRIEF DESCRIPTION OF THE DRAWINGS

FIG. 5 is a drawing that shows an example of a version table;

DETAILED DESCRIPTION OF EXEMPLARY IMPLEMENTATIONS

Figure 1:
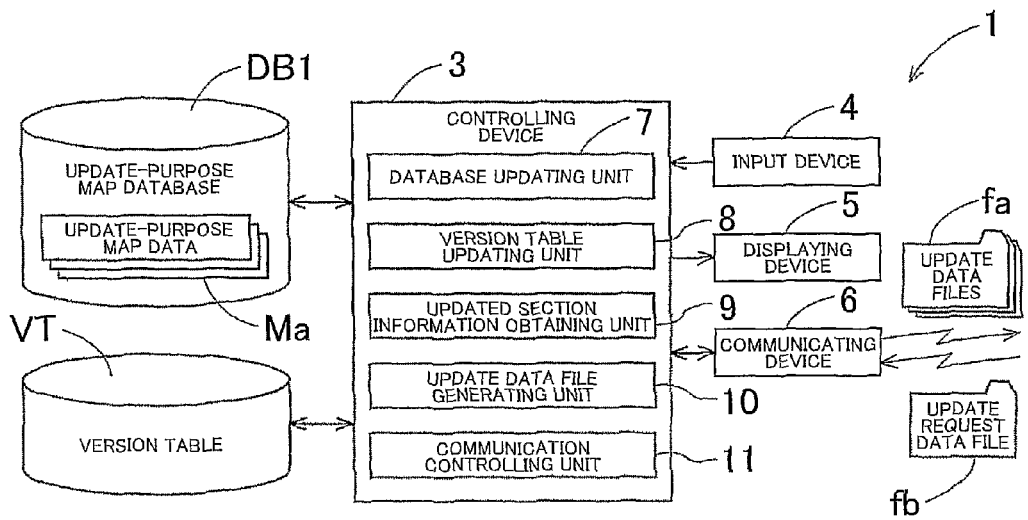
FIG. 1 is a block diagram of a first example of a map update data supplying apparatus.
Figure 2:
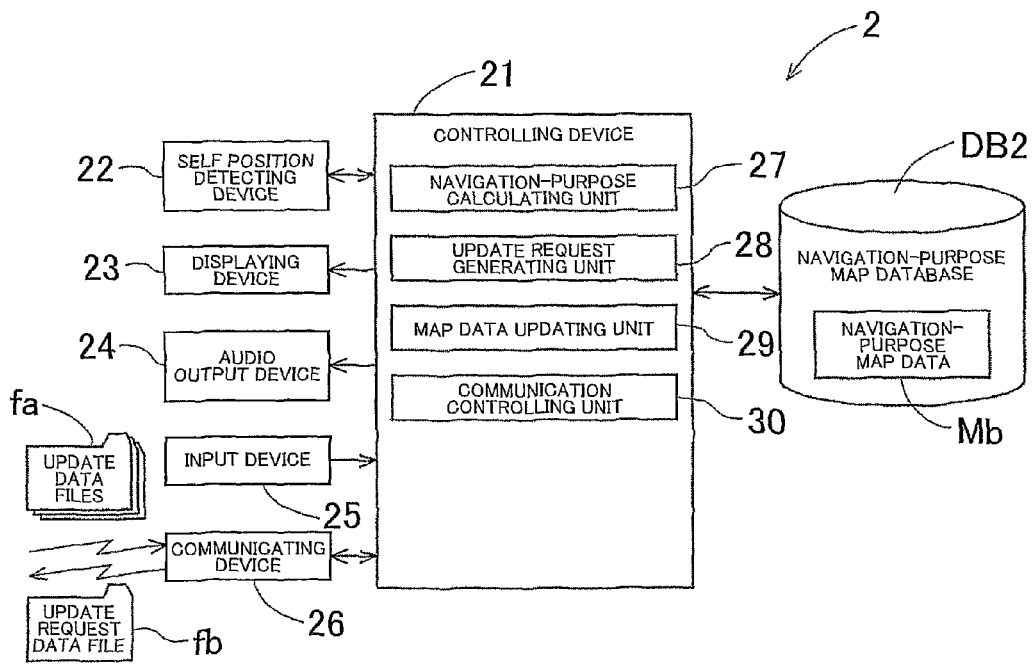
FIG. 2 is a block diagram of a first example of a navigation apparatus.

FIG. 1 is a block diagram that schematically shows an exemplary configuration of a map update data supplying apparatus 1. FIG. 2 is a block diagram that schematically shows an exemplary configuration of a navigation apparatus 2. The map update data supplying apparatus 1 and the navigation apparatus 2 include a communicating device 6 and a communicating device 26, respectively, and are connected to each other via any of various types of communication networks so that data can be transmitted to and received from each other. Thus, the map update data supplying apparatus 1 and the navigation apparatus 2 together form a map data updating system. The map update data supplying apparatus 1 supplies, to the navigation apparatus 2, update data files fa used for updating navigation-purpose map data Mb. When having received the supplied update data files fa, the navigation apparatus 2 updates the navigation-purpose map data Mb based on the update data files fa. Next, the configurations of the map update data supplying apparatus 1 and the navigation apparatus 2 will be explained in detail.

1. Map Update Data Supplying Apparatus 1

As shown in FIG. 1, the map update data supplying apparatus 1 includes: an update-purpose map database DB1, a version table VT, a controlling device (controller) 3, an input device 4, a displaying device 5, and the communicating device 6. The controlling device 3 is configured to function as a database updating unit 7, a version table updating unit 8, an updated section information obtaining unit 9, an update data file generating unit 10, and a communication controlling unit 11. The controlling device 3 is configured so as to include a computational processing device such as a CPU and storage media such as a RAM and a ROM that store therein software (i.e., programs) and data. These units 7 to 11 that are included in the controlling device 3 are configured so that functional elements, in the form of one or both of hardware and software, are installed therein for performing various types of processes on input data, while the computational processing device included in the controlling device 3 is used as a core element. The update-purpose map database DB 1 and the version table VT are each stored in a rewritable storage medium such as a hard disk drive or a flash memory. Next, the configurations of the constituent elements of the map update data supplying apparatus 1 will be explained.

1-1 Update-Purpose Map Database DB1

Figure 3:
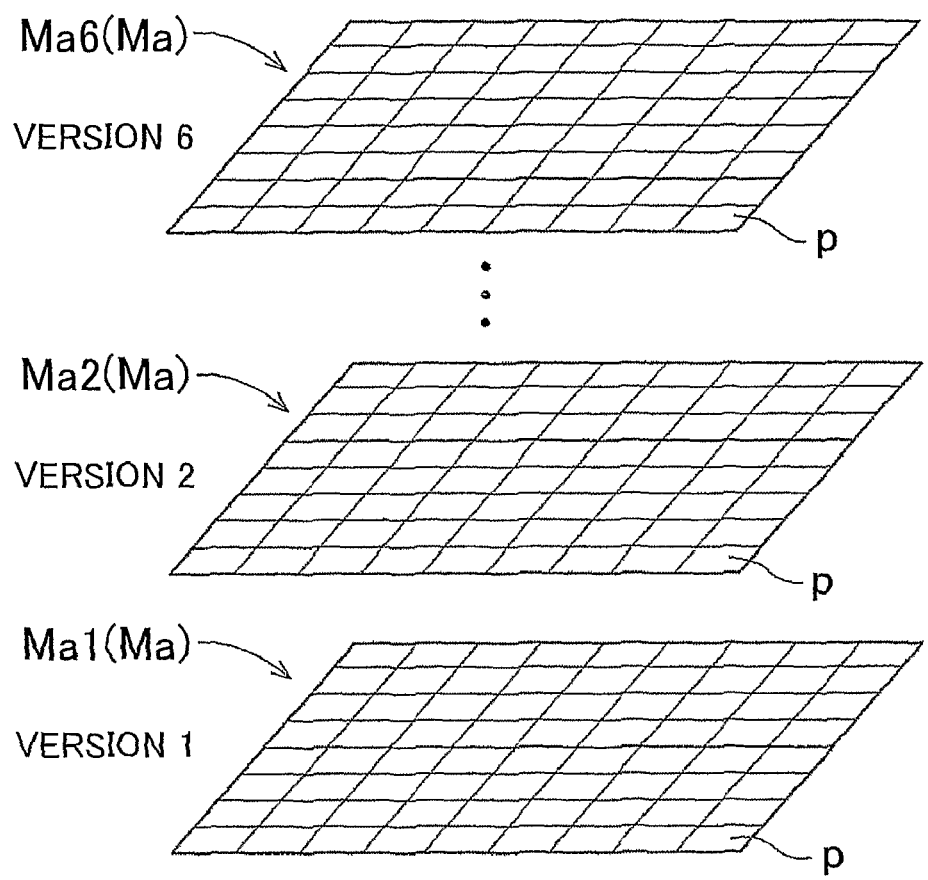
FIG. 3 is a drawing for explaining a configuration of update-purpose map data.

FIG. 3 is an exemplary configuration of update-purpose map data Ma stored in the update-purpose map database DB1. As shown in FIG. 3, the update-purpose map database DB1 stores therein a plurality of update versions of update-purpose map data Ma, and each update version of update-purpose map data is divided into a plurality of sections p. In the present example, the oldest version of update-purpose map data Ma that was generated first is referred to as Version 1. Every time the update-purpose map data Ma is updated based on new information, the version number is incremented like, such as Version 2, Version 3, and so on. The update-purpose map database DB1 stores therein six update versions of update-purpose map data Ma(up to Version 6) which is the newest version. In the description of the examples in the present application, in order to distinguish Versions 1 through 6 of the update-purpose map data Ma from one another, the update-purpose map data will be referred to by using reference characters Ma1 to Ma6, each of which indicates the version number, e.g., "Version 1 of update-purpose map data Ma1". On the other hand, the expression "update-purpose map data Ma" collectively refers to all the versions of update-purpose map data Ma1 through Ma6 together. Also, in the description of the examples in the present application, the expression "sections p" refers to the plurality of sections in the update-purpose map data Ma or in the navigation-purpose map data Mb. In order to refer to each individual section, a section number such as Section 1, Section 2 (see FIG. 10) will be used. Also, as explained later, a section that is specifically selected out of the plurality of sections p will be referred to as an "update requesting section pa" or an "update requiring section pb."

In the present example, the plurality of sections p included in the update-purpose map data Ma are obtained by dividing an area into sections p that are each in a rectangular shape and have the same size as one another. For example, when map data for the entire country of Japan is used as a target, the update-purpose map data Ma has a total area that includes the entire country of Japan. By dividing the total area into "m×n" sections (where m and n are each a natural number), the sections p are obtained. The update-purpose map data Ma includes information related to the positions and the shapes of various types of features including roads, paint markers provided along the roads, traffic lights, buildings (including houses and multi-storied buildings), structures such as bridges and tunnels, natural objects such as rivers and coastlines, and official administrative districts.

Figure 4:
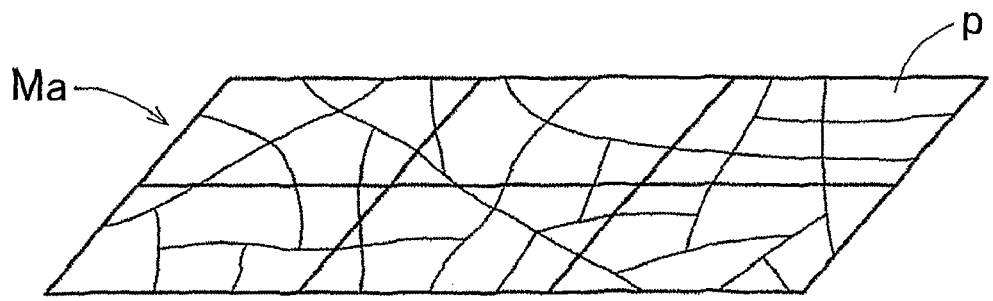
FIG. 4 is a drawing for explaining the contents of information included in the update-purpose map data.

FIG. 4 is a drawing for explaining exemplary contents of the information included in the update-purpose map data Ma. As shown in FIG. 4, the update-purpose map data Ma includes information related to a large number of features such as roads that are located in one of the sections p or located so as to extend over a plurality of sections p. Although not shown in the drawings, the update-purpose map data Ma also includes information related to various types of features other than the roads. These features may also be located so as to extend over a plurality of sections p that are positioned adjacent to one another. However, to simplify the explanation, from among the various types of features, information especially related to "roads" will be used as an example, because the roads are particularly important among the contents of the map data supplied to the navigation apparatus 2.

1-2. Version Table VT

FIG. 5 is a drawing that shows an example of the version table VT according. As shown in FIG. 5, the version table VT stores therein information related to guaranty versions va in correspondence with section groups g. Each of the section groups g is a set made up of one of the sections p in the update-purpose map data Ma and another section p that is positioned adjacent to the one of the sections. Each of the guaranty versions va is an oldest update version that is able to guarantee the integrity between the sections p that constitute a corresponding one of the section groups g. In the present example, the version table VT stores therein the information related to the section groups g each of which is a set made up of two sections p that contain one or more roads (cf. the roads are an example of a feature) located so as to extend over sections p that are positioned adjacent to each other. Accordingly, the version table VT does not store therein information related to such a section group g that contains no features that are located so as to extend over sections p that are positioned adjacent to each other. Also, the version table VT does not store therein information related to such a section group g of which the guaranty version va is "1". The reason for this can be explained as follows. In a section group g of which the guaranty version va is "1," all of the roads that are located so as to extend over the two sections that constitute the section group g have existed since a point in time when Version 1 of update-purpose map data Ma1 was in use. Thus, even if one of the two sections p that constitute the section group g is updated, the other section p does not need to be updated. In other words, there is no need for an updated section information obtaining unit 9 (explained later) to extract the other section p as an update requiring section pb.

Also, in the present example, the version table VT is configured so as to store therein two section groups g that are made up of mutually the same set of two sections p, while distinguishing one section group g that uses one of the sections p as a reference from the other section group g that uses the other section p as a reference. Accordingly, for example, the version table VT stores therein two section groups g each of which is a set made up of Section 7 and Section 8, the two section groups namely being one section group g that uses Section 7 as a reference and the other section group g that uses Section 8 as a reference. In the version table VT, the section groups g are arranged in the order of the section numbers of the sections p each of which is used as a reference in each section group g that is made up of two sections p. With this arrangement, it is possible to easily search the version table VT for any section group g and to conduct the search at a high speed.

In the version table VT, the information related to the guaranty versions va that are stored in correspondence with the section groups g indicates update versions each of which is an update version that is used when the newest road among the one or more roads (cf. the roads are an example of a feature) that are located so as to extend over the two sections p being positioned adjacent to each other and constituting a corresponding one of the section groups g appears for the first time in the update-purpose map data Ma.

Figure 6:
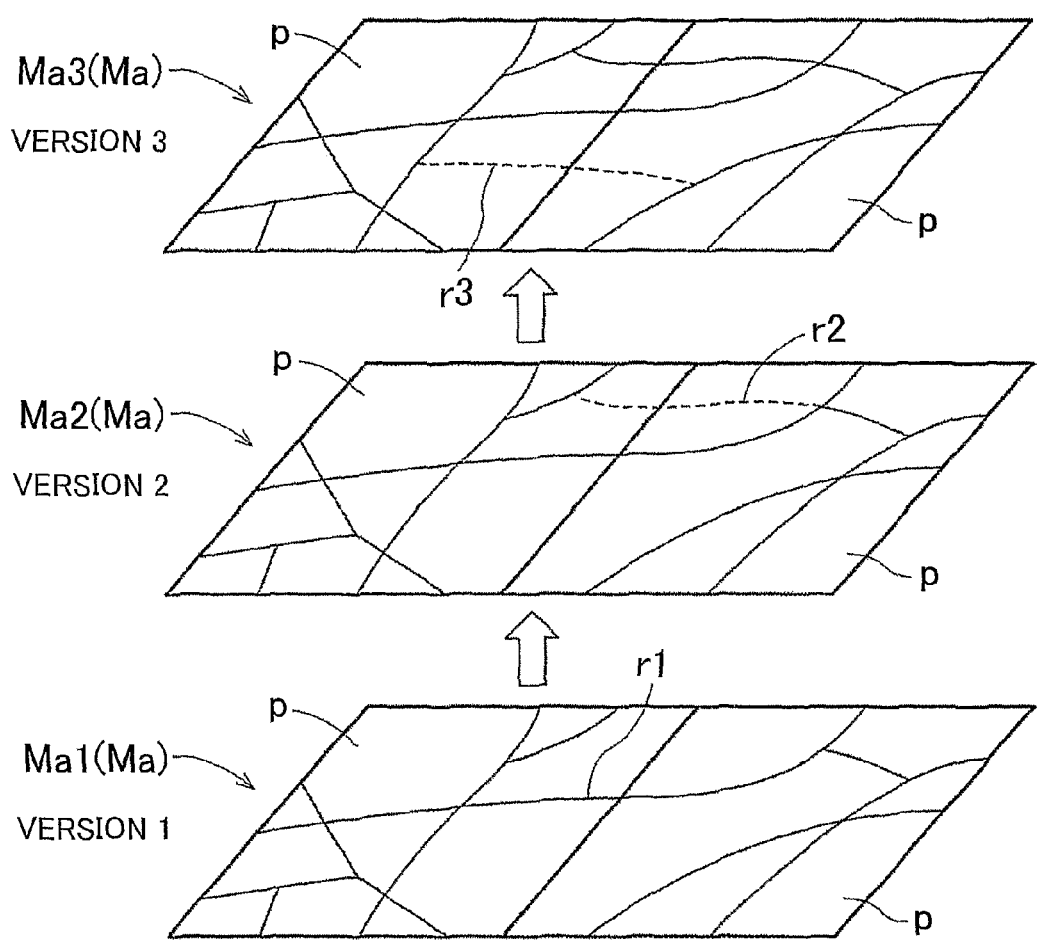
FIG. 6 is an exemplary method for determining each guaranty version.

FIG. 6 is an exemplary method, for example in the form of a program executed by the controlling device 3, for determining each of the guaranty versions va. The exemplary method may be implemented, for example, by one or more components of the above-described device. However, even though the exemplary structure of the above-described device may be referenced in the description, it should be appreciated that the structure is exemplary and the exemplary method need not be limited by any of the above-described exemplary structure.

In the example with a section group g shown in FIG. 6, in Version 1 of update-purpose map data Ma1, a road r1 is located so as to extend over the two sections p that are positioned adjacent to each other. When Version 1 of update-purpose map data Ma1 is updated to Version 2 of update-purpose map data Ma2, a road r2 has appeared as a newly-built road. When Version 2 of update-purpose map data Ma2 is updated to Version 3 of update-purpose map data Ma3, a road r3 has appeared as a newly-built road. Assuming, in the updates identified with the update versions Version 4 through Version 6 (the newest version) the roads that are located so as to extend over the sections p constituting the section group g were not updated. In this example, the three roads, namely, the roads r1, r2, and r3, are located so as to extend over the sections p that constitute the section group g. The newest road of these three roads is the road r3. The update version that is used when the road r3 appears for the first time in the update-purpose map data Ma is Version 3. Thus, the guaranty version va of the section group g in the example shown in FIG. 6 is "3". Further, in a case where there is only one road that is located so as to extend over the sections p that constitute a section group g, the update version that is used when the road appears for the first time in the update-purpose map data Ma is determined as a guaranty version va.

1-3. Input Device 4, the Displaying Device 5, and the Communicating Device 6

Next, returning to the description of FIG. 1, the input device 4, the displaying device 5, and the communicating device 6 that are included in the map update data supplying apparatus 1 will be explained. The input device 4 is configured so as to include various types of input equipment, such as a keyboard, a mouse, a touch panel, a scanner, and the like. By using the input device 4, an operator is able to perform an update input process such as to add, change, or delete the map information for the purpose of upgrading the version of the update-purpose map data Ma. The displaying device 5 is configured so as to include a liquid crystal display, a CRT display, or the like. When the operator performs an operation by using the input device 4 or the like, the displaying device 5 is operable to display a status of the update-purpose map data Ma and the contents of the updating operation. The communicating device 6 is configured so as to be able to transmit and receive data to and from the communicating device 26 included in the navigation apparatus 2, through communication that uses any various types of publicly-known wired or wireless communication networks. Examples of such communication networks include: the Internet, wired or wireless public telephone networks, wired or wireless LANs (Local Area Networks), and dedicated circuits. In addition, it is also acceptable to have an arrangement in which the communication network includes various types of publicly-known communication equipments such as personal computers and mobile phones.

1-4. Controlling Device 3

As described above, the controlling device 3 functions as a database updating unit 7, the version table updating unit 8, the updated section information obtaining unit 9, the update data file generating unit 10, and the communication controlling unit 11. The database updating unit 7 is a unit that performs, for example, the update input process such as to add, change, or delete the map information for the purpose of upgrading the version of the update-purpose map data Ma with the use of the input device 4, a process to generate a new version of update-purpose map data Ma based on the update input process, and a process to store the generated update-purpose map data Ma into the update-purpose map database DB1. The version table updating unit 8 is a unit that, when the database updating unit 7 has generated the new version of update-purpose map data Ma, performs a process to update the version table VT according to the contents of the new version of update-purpose map data Ma. The processes performed by the database updating unit 7 and the version table updating unit 8 will be explained in detail later, with reference to the flowchart shown in FIG. 11.

By referring to the version table VT, the updated section information obtaining unit 9 extracts update requiring sections pb (see FIG. 10) each of which needs to be updated in order to guarantee the integrity between the sections p that are positioned adjacent to each other, after a specified update requesting section pa has been updated. The updated section information obtaining unit 9 also obtains the information related to the guaranty version va of each of the update requiring sections pb. In this situation, the update requesting section pa denotes a section p that is a target of an update request from the navigation apparatus 2 (which is explained later), the update request requesting that the navigation-purpose map data Mb should be updated. The updated section information obtaining unit 9 performs the process to extract, as the update requiring sections pb, such sections p each of which contains a road (i.e., an example of a feature) that is located so as to extend over the sections p that are positioned adjacent to each other and each of which needs to be updated in order to guarantee the connection relationship of the road at the border between the sections p that are positioned adjacent to each other, after the update requesting section pa has been updated. The updated section information obtaining unit 9 then obtains the information related to the guaranty version va of each of the extracted update requiring sections pb, out of the version table VT. The process performed by the updated section information obtaining unit 9 will be explained in detail later, with reference to the flowchart shown in FIG. 9 and the like.

The update data file generating unit 10 generates, based on the update-purpose map database DB1, update data files fa regarding the update requesting section pa and the update requiring sections pb that have been extracted by the updated section information obtaining unit 9. More specifically, the update data file generating unit 10 generates an update data file fa having a newest update version (i.e., Version 6 in the present example) regarding the update requesting section pa. The update data file generating unit 10 also generates an update data file fa having an update version indicated as the guaranty version va regarding each of the update requiring sections pb that have been extracted by the updated section information obtaining unit 9. In the present example, each of the update data files fa is generated as a data file that includes: map data having the aforementioned update version regarding the update requesting section pa or the update requiring section pb from the navigation-purpose map data Mb; and information used for identifying the section p in the map data included in the update data file fa, for example, the section ID information that is used in common with the navigation-purpose map data Mb that is used by the navigation apparatus 2.

The communication controlling unit 11 controls the operation of the communicating device 6. More specifically, the communication controlling unit 11 controls the communication performed by the communicating device 6 between the map update data supplying apparatus 1 and the navigation apparatus 2. The communication controlling unit 11 controls the communicating device 6 so that the communicating device 6 performs the operation to receive an update request data file fb from the navigation apparatus 2 and to transmit the update data files fa to the navigation apparatus 2. According a first example, the communication controlling unit 11 and the communicating device 6 structure together supply the update data files fa to the navigation apparatus 2.

2. Navigation Apparatus 2

As shown in FIG. 2, the navigation apparatus 2 includes a navigation-purpose map database DB2, a controlling device (controller) 21, a self position detecting device 22, a displaying device 23, an audio output device 24, an input device 25, and the communicating device 26. The controlling device 21 functions as a navigation-purpose calculating unit 27, an update request generating unit 28, a map data updating unit 29, and a communication controlling unit 30. The navigation-purpose calculating unit 27 performs basic guidance functions offered by the navigation apparatus 2. The basic guidance functions offered by the navigation apparatus 2 include, for example, displaying a map of an area around the position of the navigation apparatus 2 (hereinafter, a "self position") or a specified position, calculating a route from a starting point to a destination point, providing guidance to a destination point, performing a map matching process to correct the self position on a road, and searching for a destination point.

The controlling device 21 included in the navigation apparatus 2 is configured so as to include a computational processing device such as a CPU as well as storage media such as a RAM and a ROM that store therein software (i.e., programs) and data. These units 27 to 30 that are included in the controlling device 21 are configured so that functional elements, in the form of one or both of hardware and software, are installed therein for performing various types of processes on input data, while the computational processing device included in the controlling device 21 is used as a core element. The navigation-purpose map database DB2 is stored in a rewritable storage medium such as a hard disk drive or a flash memory. Next, the configurations of the constituent elements of the navigation apparatus 2 will be explained.

2-1. Navigation-Purpose Map Database DB2

Figure 7:
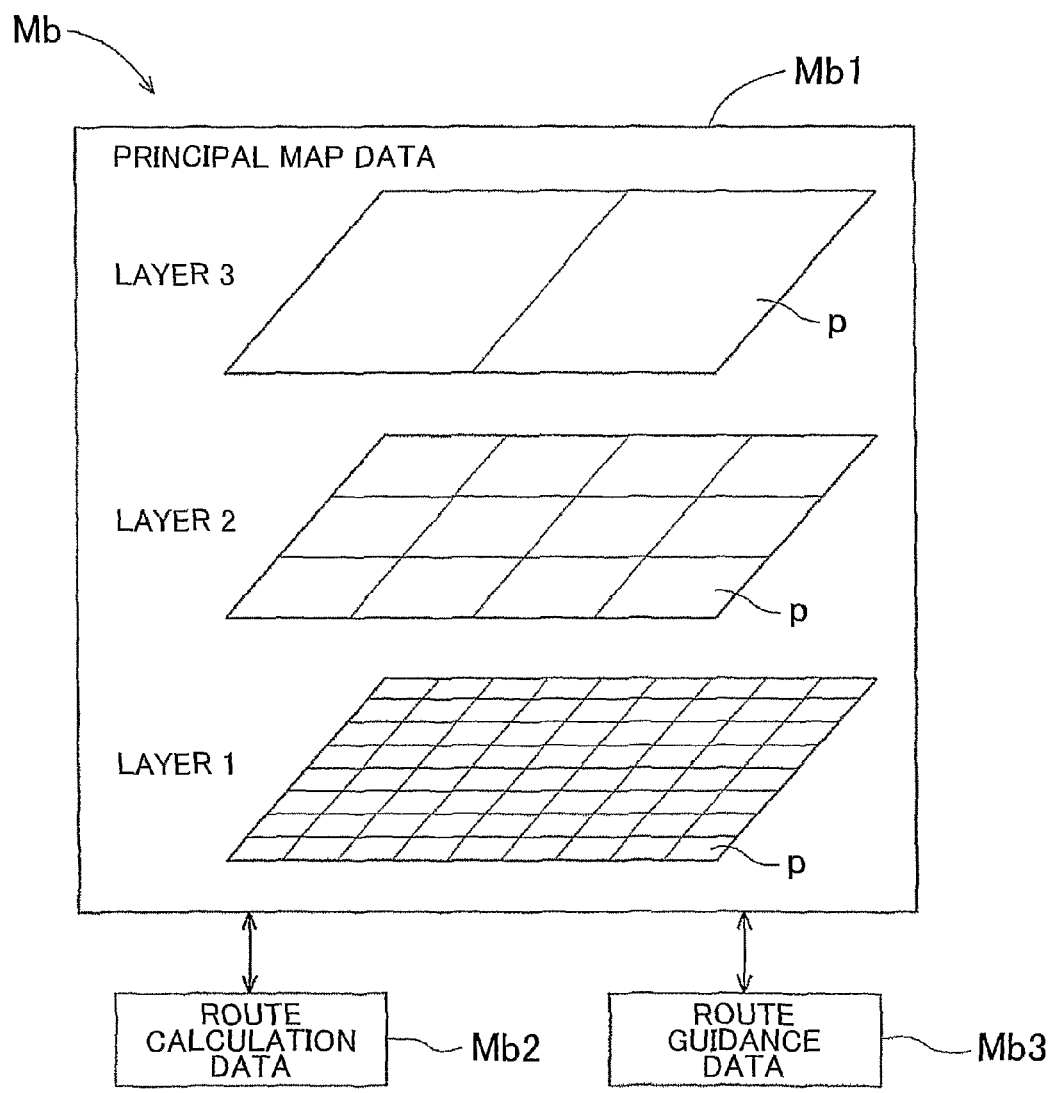
FIG. 7 is a drawing for explaining an exemplary configuration of navigation-purpose map data.

The navigation-purpose map database DB2 stores therein the navigation-purpose map data Mb that is map data referred to by the navigation-purpose calculating unit 27 in order to realize the guidance functions of the navigation apparatus 2. According to the present example, the navigation-purpose map data Mb corresponds to the "target map data" defined in the present invention. FIG. 7 is an exemplary configuration of the navigation-purpose map data Mb that is stored in the navigation-purpose map database DB2. As shown in FIG. 7, the navigation-purpose map data Mb includes principal map data Mb1, route calculation data Mb2, and route guidance data Mb3. The principal map data Mb1 is divided into a plurality of layers (hierarchical levels) according to the degree of detail of the stored information related to the features such as roads. In the present example, the principal map data Mb1 has three layers, namely Layer 1, Layer 2, and Layer 3, from the lower level to the higher level. In this example, the lower the layer is, the more detailed the information related to the features such as the roads is. Each of the layers in the principal map data Mb 1 is divided into a plurality of sections p. In this situation, the higher the layer is, the larger area each section p corresponds to. Accordingly, a section p in a higher layer contains an area that corresponds to a plurality of sections p in a lower layer. Each of the layers in the principal map data Mb1 includes information related to road networks constituted by links and nodes. The navigation-purpose calculating unit 27 refers to the principal map data Mb1 when, for example, displaying a map of an area around a self position or a specified position, or performing a map matching process to correct the self position onto a road.

The route calculation data Mb2 is stored in correspondence with the principal map data Mb1. The route calculation data Mb2 is configured so as to include information related to costs and traveling conditions of the links that constitute the road networks mentioned above and also correspondence relationships of the nodes between a layer and its higher layer. The navigation-purpose calculating unit 27 refers to the route calculation data Mb2, when calculating a route from a starting point to a destination point. The route guidance data Mb3 is stored in correspondence with the principal map data Mb1. The route guidance data Mb3 is configured so as to include information related to images and audio that are required in order to provide route guidance to a destination point. Accordingly, the navigation-purpose calculating unit 27 refers to the route guidance data Mb3, when providing route guidance to the destination point.

As explained above, in the principal map data Mb1 included in the navigation-purpose map data Mb, the size of an area in actuality that corresponds to each section p is different from one layer to another. In the present example, the area size of each section p in Layer I in the principal map data Mb1 corresponds to the area size of each section p in the update-purpose map data Ma. Accordingly, the update data files fa that are supplied by the map update data supplying apparatus 1 are data files in units of sections that correspond to the sections p in Layer 1 in the principal map data Mb1. Layer 2 and Layer 3 in the principal map data Mb1 as well as the route calculation data Mb2 and the route guidance data Mb3 are generated and updated by the map data updating unit, based on the data for Layer 1 in the principal map data Mb1 that is obtained after updates have been performed with the use of the update data files fa.

2-2. Self Position Detecting Device 22

The self position detecting device 22 is a device that detects a current position of the navigation apparatus 2. Thus, although not shown in the drawings, the self position detecting device 22 is configured so as to include, for example, a GPS receiver, a direction sensor, and a distance sensor. The self position detecting device 22 obtains information related to coordinates indicating a current position and a traveling direction, based on the information obtained by the GPS receiver and the sensors and outputs the obtained information to the controlling device 21. In the controlling device 21, the navigation-purpose calculating unit 27 performs the processes for displaying the self position and for performing the map matching process, based on the self position information detected by the self position detecting device 22 and the navigation-purpose map data Mb.

2-3. Displaying Device 23, the Audio Output Device 24, the Input Device 25, and the Communicating Device 26

The displaying device 23 is configured so as to include a liquid crystal display or the like. The audio output device 24 is configured so as to include a speaker, an amplifier, and the like. The displaying device 23 and the audio output device 24 are operated under the control of the navigation-purpose calculating unit 27 and display images and output audio in order to display a self position, to calculate a route between two location points, to provide guidance on traveling directions, and to search for a destination point. The input device 25 is configured so as to include a touch panel, an operation switch, a remote controller, and so on that are integrally provided with the displaying device 23. The input device 25 receives an operation input by a user and outputs the contents of the received input to the controlling device 21. The communicating device 26 is configured, as described above, so as to be able to transmit and receive data to and from the communicating device 6 included in the map update data supplying apparatus 1, through communication that uses any of various types of publicly-known wired or wireless communication networks.

2-4. Controlling Device 21

As explained above, the controlling device 21 functions as the navigation-purpose calculating unit 27, the update request generating unit 28, the map data updating unit 29, and the communication controlling unit 30. The navigation-purpose calculating unit 27 is, as described above, the calculating unit that realizes the basic guidance functions offered by the navigation apparatus 2 such as, for example, displaying a map of an area around a self position or a specified position, calculating a route from a starting point to a destination point, providing guidance to a destination point, performing a map matching process to correct the self position onto a road, and searching for a destination point. In the present example, although not shown in the drawings, the navigation-purpose calculating unit 27 includes, as programs for performing the navigation processes, five application programs such as a display program, a map matching program, a route calculation program, a guidance program, and a search program. The display program is a program used for displaying a map of an area around a self position or a destination point on a display screen in the displaying device 23 or displaying a self position on the displayed map. The map matching program is a program used for performing the map matching process to cause a self position detected by the self position detecting device 22 to match a position on a road in a map. The route calculation program is a program used for performing a route calculation process to search for a guidance route, for example, from a starting point such as a self position to a destination point that has been input by using the input device 25. The guidance program is a program used for performing a process to provide guidance for the user with appropriate traveling directions, according to the route to the destination point that has been determined by the route calculation program, by using the guidance display provided on the display screen in the displaying device 23 and/or the audio guidance provided by the audio output device 24. The search program is a program used for searching for a destination point or a location point to be displayed on a map, based on an address, a telephone number, a name of a facility, a genre, or the like. The operation processes of the navigation apparatus 2 that performs these application programs are publicly known. Thus, the detailed explanation thereof will be omitted. The navigation-purpose map data Mb is used and referred to by each of these application programs.

The update request generating unit 28 is a unit that generates the update request data file fb regarding an update requesting section pa. In this situation, the update request generating unit 28 determines the update requesting section pa and generates the update request data file fb for requesting the update data file fa regarding the update requesting section pa from the map update data supplying apparatus 1. In the present example, the update requesting section pa is one or more sections p in the navigation-purpose map data Mb that need to be referred to by the navigation-purpose calculating unit 27 included in the navigation apparatus 2, and the one or more sections p are selected from among the sections p in Layer 1 in the principal map data Mb1. The sections p that need to be referred to by the navigation-purpose calculating unit 27 may include a section p that is currently needed and a section p that has a high possibility of being needed in the future. Thus, the update requesting section pa corresponds to a section p that contains, for example, one or more of the following: an area around a position that is registered as the user's home; an area around a current self position detected by the self position detecting device 22; an area around a destination point; and an area around a route to a specified destination point. In order to determine the update requesting section pa, it is also acceptable to have an arrangement in which, for example, for an area around the position of the user's home, the area to be updated is arranged to be large so that a large number of sections p are selected, whereas for an area around a route to a destination point, the area to be updated is arranged to be small so that a requisite minimum number of sections p are selected. When a request that the map updating process should be performed is received with a specification of an area from the user of the navigation apparatus 2, the one or more sections p that are contained in the specified area will be each used as the update requesting section pa. The update request data file fb is generated as a data file that includes information used for identifying each of the one or more update requesting sections pa that have been determined, such as the section ID information that is used in common with the update-purpose map data Ma that is used by the map update data supplying apparatus 1.

The map data updating unit 29 is a unit that updates the navigation-purpose map data Mb based on the update data files fa supplied by the map update data supplying apparatus 1. As explained above, in the present example, each of the update data files fa is a file that contains map data regarding the update requesting section pa or the update requiring section pb. Accordingly, the map data updating unit 29 updates the navigation purpose map data Mb by changing the map data for the sections p that correspond to the update requesting section pa and the update requiring sections pb in Layer 1 in the principal map data Mb 1 included in the navigation-purpose map data Mb, to the map data for the update requesting section pa and the update requiring sections pb contained in the update data files fa.

The communication controlling unit 30 is a unit that controls the operation of the communicating device 26. More specifically, the communication controlling unit 30 controls the communication performed by the communicating device 26 between the map update data supplying apparatus 1 and the navigation apparatus 2. The communication controlling unit 30 controls the communicating device 26 so that the communicating device 26 performs the operation to transmit the update request data file fb to the map update data supplying apparatus 1 and receives the update data files fa from the map update data supplying apparatus 1. Thus, according to the first embodiment, the communication controlling unit 30 and the communicating device 26 structure the "update data file obtaining unit" that obtains the update data files supplied by the map update data supplying apparatus.

3. Operation Process Performed by the Map Update Data Supplying Apparatus 1

Next, an operation process performed by the map update data supplying apparatus 1 will be explained in detail with reference to a flowchart. In the following description, first, a process that is performed by the map update data supplying apparatus 1 to generate and transmit the update data files fa in response to an update request from the navigating apparatus 2 requesting that the navigation-purpose map data Mb should be updated will be explained. Secondly, a process that is performed so as to obtain the information related to the sections that need to be updated in order to perform the process of generating and transmitting the update data files fa will be explained. After that, a process that is performed so as to update the update-purpose map data Ma and to update the version table VT accordingly will be explained.

3-1. Process to Generate and Transmit the Update Data Files fa

Figure 8:
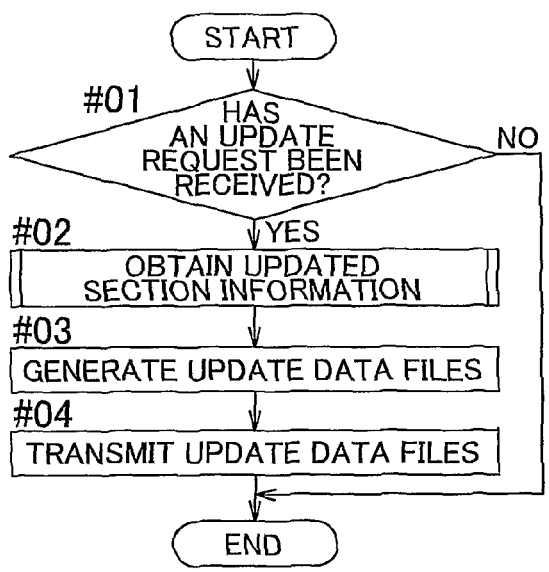
FIG. 8 is a method to generate update data files that may be performed by, for example, the map update data supplying apparatus.

FIG. 8 is a flowchart that shows a procedure in a process to generate update data files fa that is performed by the map update data supplying apparatus 1. As shown in FIG. 8, when having received an update request from the navigation apparatus 2, in other words, when having received an update request data file fb (step #01: Yes), the map update data supplying apparatus 1 causes the updated section information obtaining unit 9 to obtain updated section information (step #02). The process to obtain the updated section information at step #02 is to extract, by referring to the version table VT, update requiring sections pb each of which needs to be updated in order to guarantee the integrity between sections p that are positioned adjacent to each other after an update requesting section pa has been updated, and further obtains the information related to the guaranty version va of each of the update requiring sections pb. In the version table VT, with respect to each of the section groups g, each of which is a set made up of one of the sections p in the update-purpose map data Ma and another section p that is positioned adjacent thereto, a guaranty version is shown, which is an oldest update version that is able to guarantee the integrity between the sections p that constitute the corresponding section group g. The process to obtain the updated section information will be explained more specifically later, with reference to the flowchart shown in FIG. 9.

After that, the map update data supplying apparatus 1 causes the update data file generating unit 10 to perform the process to generate the update data files fa (step #03). More specifically, in this process, as shown in FIG. 3, an update data file fa having the newest update version (Version 6 in the present example) is generated regarding the update requesting section pa, based on the different versions of update-purpose map data Ma (i.e., Ma1 through Ma6) that are stored in the update-purpose map database DB 1. In addition, in a case where one or more update requiring sections pb have been extracted at step #02, an update data file fa having an update version indicated as the guaranty version va is also generated at step #03, regarding each of the extracted update requiring sections pb. Subsequently, the map update data supplying apparatus 1 causes the communication controlling unit 11 to control the communicating device 6 so that the update data files fa that have been generated at step #03 are transmitted to the navigation apparatus 2 (step #04). As a result of the process described here, the update data files fa are supplied to the navigation apparatus 2 (i.e., to the target map data side).

3-2. Process to Obtain the Updated Section Information.

Next, the procedure in the process to obtain the updated section information at step #02 will be explained. In the present example, as explained above, the updated section information obtaining unit 9 performs the process to extract, as the update requiring sections pb each of which needs to be updated in order to guarantee the integrity between the sections p that are positioned adjacent to each other after the update requesting section pa has been updated, such sections p each of which contains a road (i.e., an example of a feature) that is located so as to extend over the sections p that are positioned adjacent to each other and each of which needs to be updated in order to guarantee the connection relationship of the road at the border between the sections p that are positioned adjacent to each other after the update requesting section pa has been updated. Each of the update requiring sections pb is extracted by performing the following procedure: (i) by using the update requesting section pa as a reference section, sequentially tracing such section groups g each of which has a relationship of which the integrity needs to be guaranteed, (ii) sequentially extracting such section groups g each of which has a relationship that has the same guaranty version va or an older guaranty version va, in view of the order in which the section groups g are traced, and (iii) extracting the sections p that constitute each of the extracted section groups g as the update requiring sections pb. After that, the information related to the guaranty version va of each of the extracted update requiring sections pb is obtained from the version table VT.

Figure 9:
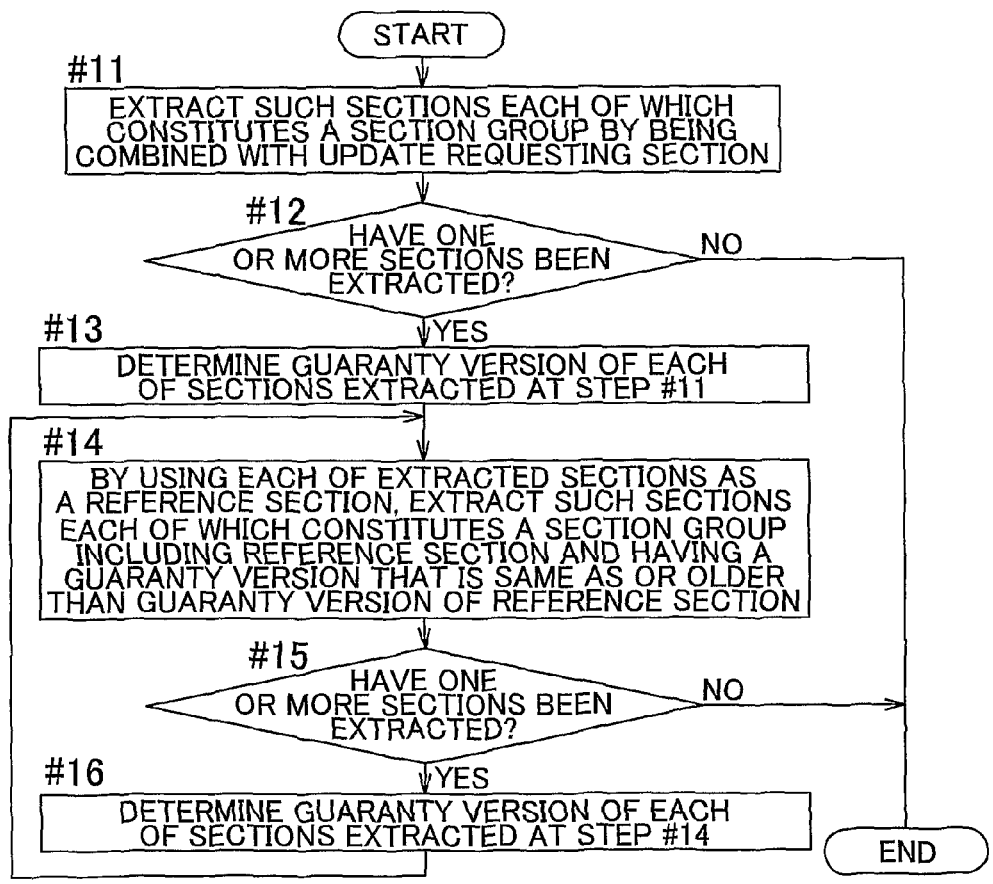
FIG. 9 is a method to obtain updated section information that may be performed by, for example, the map update data supplying apparatus.
Figure 10:
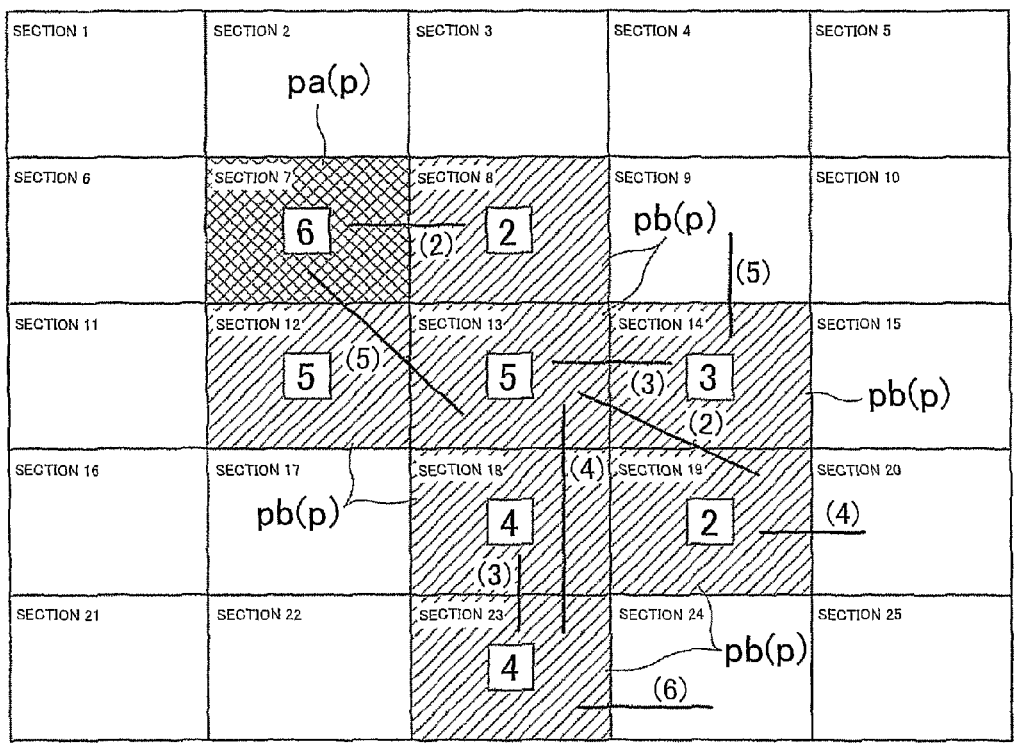
FIG. 10 is a specific example of a method to extract update requiring sections.

FIG. 9 is a flowchart that shows the procedure in the process to obtain the updated section information as described here. FIG. 10 is a drawing for explaining a specific example of the process to extract the update requiring sections pb. In FIG. 10, the numbers in the boxes that are arranged in the middle of some of the section p are the update version of the update requesting section pa and the guaranty versions va of the update requiring sections pb. The lines, each of which are located so as to extend over a plurality of sections p, represent roads (cf. the roads are an example of a feature). Each of the numbers in the parentheses that are shown near the roads are an update version that is used when the corresponding road appears for the first time in the update-purpose map data Ma. In the following description, an example will be explained in which Section 7 shown in FIG. 10 is the update requesting section pa. In this situation, regarding the update requesting section pa, the update data file fa having the newest update version will be supplied to the navigation apparatus 2. Thus, in the present example, the update version of the update requesting section pa is Version 6.

As shown in FIG. 9, first, by referring to the version table VT, the updated section information obtaining unit 9 extracts such sections p each of which constitute a section group g by being combined with the update requesting section pa (Section 7 in the present example), by using the update requesting section pa as a reference section (step #11). By referring to the version table VT shown in FIG. 5, it is understood that Section 8 and Section 12 are stored as the section p, each of which constitutes a section group g by being combined with the update requesting section pa, which is Section 7. Accordingly, in the present example, Section 8 and Section 12 are extracted at step #11. The sections p (Section 8 and Section 12 in the present example) that have been extracted in this manner will be used as the update requiring sections pb. Next, the updated section information obtaining unit 9 judges whether or not one or more sections p have been extracted at step #11 (step #12). In a case where no section p has been extracted (step #12: No), the process ends at this point because there is no update requiring section pb.

On the other hand, in a case where one or more sections p (i.e., one or more update requiring sections pb) have been extracted at step #11 like in the present example, (step #12: Yes), the guaranty version va of each of the extracted update requiring sections pb will be determined (step #13). In this situation, the updated section information obtaining unit 9 determines the guaranty version va of the section group g (see FIG. 5) that is made up of each of the extracted update requiring sections pb and the update requesting section pa as the guaranty version va of the corresponding one of the update requiring sections pb. In the present example, the update requesting section pa is Section 7, whereas the update requiring sections pb are Section 8 and Section 12. Accordingly, the guaranty version va of Section 8 is the guaranty version va of the section group g that is made up of Section 7 and Section 8, which is "2." The guaranty version va of Section 12 is the guaranty version va of the section group g that is made up of Section 7 and section 12, which is "5." The numbers in the boxes that are arranged in the middle of the update requiring sections pb in FIG. 10 are the guaranty versions va of the update requiring sections pb.

Next, by using each of the update requiring sections pb (Section 8 and Section 12 in the present example) that have been extracted at step #11 as a reference section, such a section p is extracted that constitutes the section group g including the reference section and having a guaranty version va that is the same as or older than the guaranty version va of the reference section (step #14). In this situation, needless to say, any section p that has already been extracted (in the present example, Section 7 that is used as the update requesting section pa) is not eligible as a target of the extraction. When the version table VT shown in FIG. 5 is referred to, only Section 7, which has already been extracted, corresponds to the section p that constitutes the section group g including Section 8, which is one of the reference sections. Thus, no section p is extracted by using Section 8 as a reference section. On the other hand, other than Section 7, which has already been extracted, Section 13 is stored as such a section p that constitutes the section group g including Section 12, which is another reference section. The guaranty version va of the section group g that is made up of Section 12 and Section 13 is "5" and is the same as the guaranty version va of Section 12 that has been determined at step #13. Accordingly, in the present example, as shown in FIG. 10, Section 13 is extracted by using Section 12 as the reference section at step #14. Each of the one or more sections p that have been extracted in this manner (Section 13 in the present example) is determined as the update requiring section pb. Next, the updated section information obtaining unit 9 judges whether or not one or more sections p have been extracted at step #14 (step #15). In a case where no section p has been extracted (step #15: No), the process ends at this point.

On the other hand, in a case where one or more sections p (i.e., one or more update requiring sections pb) have been extracted at step #14 like in the present example (step #15: Yes), the updated section information obtaining unit 9 determines the guaranty version va of each of the update requiring sections pb that have been extracted (step #16). In this situation, the updated section information obtaining unit 9 determines the guaranty version va of the section group g (see FIG. 5) that is made up of each of the extracted update requiring sections pb and the reference section, as the guaranty version va of the corresponding one of the update requiring sections pb. In the present example, because Section 13 has been extracted by using Section 12 as the reference section, the guaranty version va of Section 13 is determined as the guaranty version va of the section group g that is made up of Section 12 and Section 13, which is "5".

After that, by using each of the update requiring sections pb that have been extracted at step #14 as a new reference section now, the updated section information obtaining unit 9 repeats the processes at steps #14 through #16 until there is no more section group g having a guaranty version va that is the same as or older than the guaranty version va of the reference section, in other words, until "No" is obtained as a judgment result at step #15. In the present example, by using Section 13 as a reference section now, a section p is extracted that constitutes the section group g including the reference section and having a guaranty version va that is the same as or older than the guaranty version va of the reference section (step #14). When the version table VT shown in FIG. 5 is referred to, other than Section 12, which has already been extracted, Section 14 and Section 18 are each stored as such a section that constitutes the section group g that includes the reference section, that is namely Section 13. The guaranty version va of the section group g that is made up of Section 13 and Section 14 is "3," whereas the guaranty version va of the section group g that is made up of Section 13 and Section 18 is "4." Both "3" and "4" are older than the guaranty version va "5" of Section 13, which is the reference section. Thus, in this situation, as shown in FIG. 10, Section 14 and Section 18 are extracted by using Section 13 as the reference section. Thus, Section 14 and Section 18 that have been extracted in this manner are determined as the update requiring sections pb. After that, the updated section information obtaining unit 9 determines the guaranty versions va of Section 14 and Section 18, which are the update requiring sections pb that have been extracted (step #16). In the present example, the guaranty version va of Section 14 is the guaranty version va of the section group g that is made up of Section 13 and Section 14, which is "3." The guaranty version va of Section 18 is the guaranty version va of the section group g that is made up of Section 13 and Section 18, which is "4."

It should be noted that, as shown in FIG. 10, there are two roads that are located so as to extend over Section 13 and Section 14. The update versions that are used when these roads appear for the first time in the update-purpose map data Ma are Version 3 for one of the roads, and Version 2 for the other. Accordingly, when the version table VT shown in FIG. 5 is referred to, Version 3, which is the update version that is used when the newest road among these roads (cf. the roads are an example of a feature) appears for the first time in the update-purpose map data Ma, is determined as the guaranty version va of the section group g that is made up of Section 13 and Section 14.

Next, by using Section 14 and Section 18, each as a new reference section, sections p are extracted in the same manner as described above. First, a process performed by using Section 14 as a reference section will be explained. First of all, such sections p are extracted each of which constitutes the section group g including the reference section, that is namely Section 14, and having a guaranty version va that is the same as or older than the guaranty version va of the reference section (step #14). When the version table VT shown in FIG. 5 is referred to, other than Section 13, which has already been extracted, Section 9 and Section 19 are each stored as such a section that constitutes the section group g that includes the reference section, that is namely Section 14. The guaranty version va of the section group g that is made up of Section 14 and Section 9 is "5" and is therefore newer than the guaranty version va "3" of the reference section, that is namely Section 14. On the other hand, the guaranty version va of the section group g that is made up of Section 14 and section 19 is "2" and is therefore older than the guaranty version va "3" of the reference section, that is namely Section 14. Accordingly, in this situation, as shown in FIG. 10, Section 19 is extracted by using Section 14 as the reference section. Section 19 that has been extracted in this manner is determined as the update requiring section pb. After that, the updated section information obtaining unit 9 determines the guaranty version va of Section 19, which is the update requiring section pb that has been extracted (step #16). In the present example, the guaranty version va of Section 19 is determined as the guaranty version va of the section group g that is made up of Section 14 and Section 19, which is "2".

Secondly, a process performed by using Section 18 as a reference section will be explained. First of all, such sections p are extracted each of which constitutes the section group g including the reference section, that is namely Section 18, and having a guaranty version va that is the same as or older than the guaranty version va of the reference section (step #14). When the version table VT shown in FIG. 5 is referred to, other than Section 13, which has already been extracted, Section 23 is stored as such a section that constitutes the section group g that includes the reference section, that is namely Section 18. The guaranty version va of the section group g that is made up of Section 18 and Section 23 is "4" and is therefore the same as the guaranty version va "4" of the reference section, that is namely Section 18. Accordingly, in this situation, as shown in FIG. 10, Section 23 is extracted by using Section 18 as the reference section. Section 23 that has been extracted in this manner is determined as the update requiring section pb. After that, the updated section information obtaining unit 9 determines the guaranty version va of Section 23, which is the update requiring section pb that has been extracted (step #16). In the present example, the guaranty version va of Section 23 is determined as the guaranty version va of the section group g that is made up of Section 18 and Section 23, which is "4".

It should be noted that, as shown in FIG. 10, there are two roads that are located so as to extend over Section 18 and Section 23. The update versions that are used when these roads appear for the first time in the update-purpose map data Ma are Version 4 for one of the roads, and Version 3 for the other. Accordingly, when the version table VT shown in FIG. 5 is referred to, Version 4, which is the update version that is used when the newest road among these roads (cf. the roads are an example of a feature) appears for the first time in the update-purpose map data Ma, is determined as the guaranty version va of the section group g that is made up of Section 18 and Section 23.

After Section 19 has been extracted by using Section 14 as the reference section, and Section 23 has been extracted by using Section 18 as the reference section, now sections p are extracted in the same manner as described above, by using Section 19 and Section 23, each as a new reference section. First, a process performed by using Section 19 as a reference section will be explained. First of all, such sections p are extracted each of which constitutes the section group g including the reference section, that is namely Section 19, and having a guaranty version va that is the same as or older than the guaranty version va of the reference section (step #14). When the version table VT shown in FIG. 5 is referred to, other than Section 14, which has already been extracted, Section 20 is stored as such a section that constitutes the section group g that includes the reference section, that is namely Section 19. The guaranty version va of the section group g that is made up of Section 19 and Section 20 is "4" and is therefore newer than the guaranty version va "2" of the reference section, that is namely Section 19. Accordingly, in this situation, as shown in FIG. 10, no section p is extracted by using Section 19 as the reference section.

Secondly, a process performed by using Section 23 as a reference section will be explained. First of all, such sections p are extracted each of which constitutes the section group g including the reference section, that is namely Section 23, and having a guaranty version va that is the same as or older than the guaranty version va of the reference section (step #14). When the version table VT shown in FIG. 5 is referred to, other than Section 18, which has already been extracted, Section 24 is stored as such a section that constitutes the section group g that includes the reference section, that is namely Section 23. The guaranty version va of the section group g that is made up of Section 23 and Section 24 is "6" and is therefore newer than the guaranty version va "4" of the reference section, that is namely Section 23. Accordingly, in this situation, as shown in FIG. 10, no section p is extracted by using Section 23 as the reference section.

Accordingly, in the present example, there is no more section group g having a guaranty version va that is the same as or older than the guaranty version va of the reference section. Thus, there is no section p that is extracted at step #14 (step #15: No). Consequently, the process to obtain the updated section information that is performed at step #02 shown in FIG. 8 ends at this point. As a result of the process to obtain the updated section information, in the present example, Sections 8, 12, 13, 14, 18, 19, and 23 have been extracted as the update requiring sections pb. Also, the guaranty version va of each of these update requiring sections pb have been obtained.

3-3. Process to Update the Update-Purpose Map Data Ma and the Version Table VT

Figure 11:
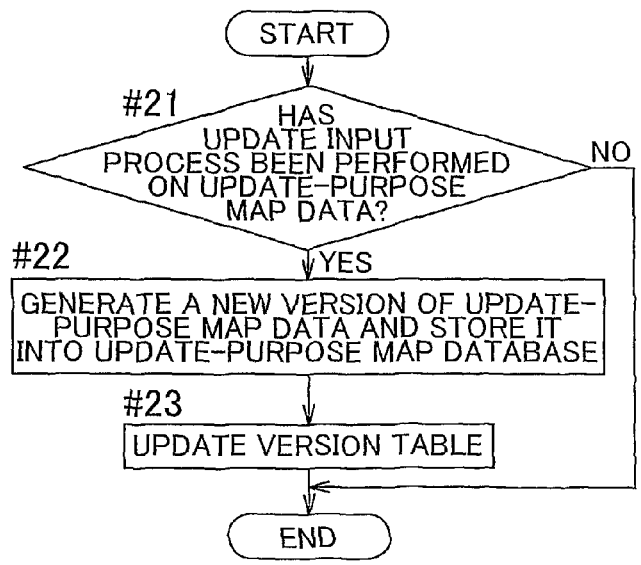
FIG. 11 is an exemplary flowchart of a method to update the update-purpose map data and the version table.

FIG. 11 is a flowchart that shows a procedure in a process to update the update-purpose map data Ma and the version table VT. As shown in FIG. 11, the map update data supplying apparatus 1 judges whether an update input process has been performed by using the input device 4 such as a process to add, change, or delete the map information for the purpose of upgrading the version of the update-purpose map data Ma (step #21). In a case where an update input process for the update-purpose map data Ma has been performed (step #21: Yes), the map update data supplying apparatus 1 causes the database updating unit 7 to generate, based on the contents of the update input process, a new version of update-purpose map data Ma that has been updated and to store the generated update-purpose map data Ma into the update-purpose map database DB1 (step #22). In this situation, the new version of update-purpose map data Ma after the update is generated by performing the process to add, change, or delete the map information included in the contents of the update input process on the existing newest version of update-purpose map data Ma that is currently stored in the update-purpose map database DB1.

After that, the map update data supplying apparatus 1 causes the version table updating unit 8 to update the version table VT (step #23). In this situation, based on the new version of update-purpose map data Ma after the update that has been generated by the database updating unit 7, the version table updating unit 8 performs a process to have information of roads reflected in the version table VT, the roads (cf. the roads are an example of a feature) being located so as to extend over the sections p that are positioned adjacent to each other and having newly been added, changed, or deleted due to the update. More specifically, for example, in a case where a road that is located so as to extend over two sections p that are positioned adjacent to each other has newly been added or changed, and the section group g that is made up of these two sections is not stored in the version table VT, the version table updating unit 8 adds the information of this section group g to the version table VT, and also stores the information of a guaranty version va that is the same as the update version of the new update-purpose map data Ma after the update, in correspondence with the section group g. On the other hand, in the same situation but in a case where the section group g that is made up of these two sections p has already been stored in the version table VT, the version table updating unit 8 stores the information of the guaranty version va that is the same as the update version of the new update-purpose map data Ma after the update, in correspondence with the section group g stored in the version table VT. As another example, in a case where a road that is located so as to extend over two sections p that are positioned adjacent to each other is no longer used, in consideration of other roads that are located so as to extend over these two sections p, the version table updating unit 8 stores, into the version table VT, the information of a guaranty version va indicating the oldest update version that is able to guarantee the integrity between these two sections p, in correspondence with the section group g that is made up of these two sections p.

Figure 12:
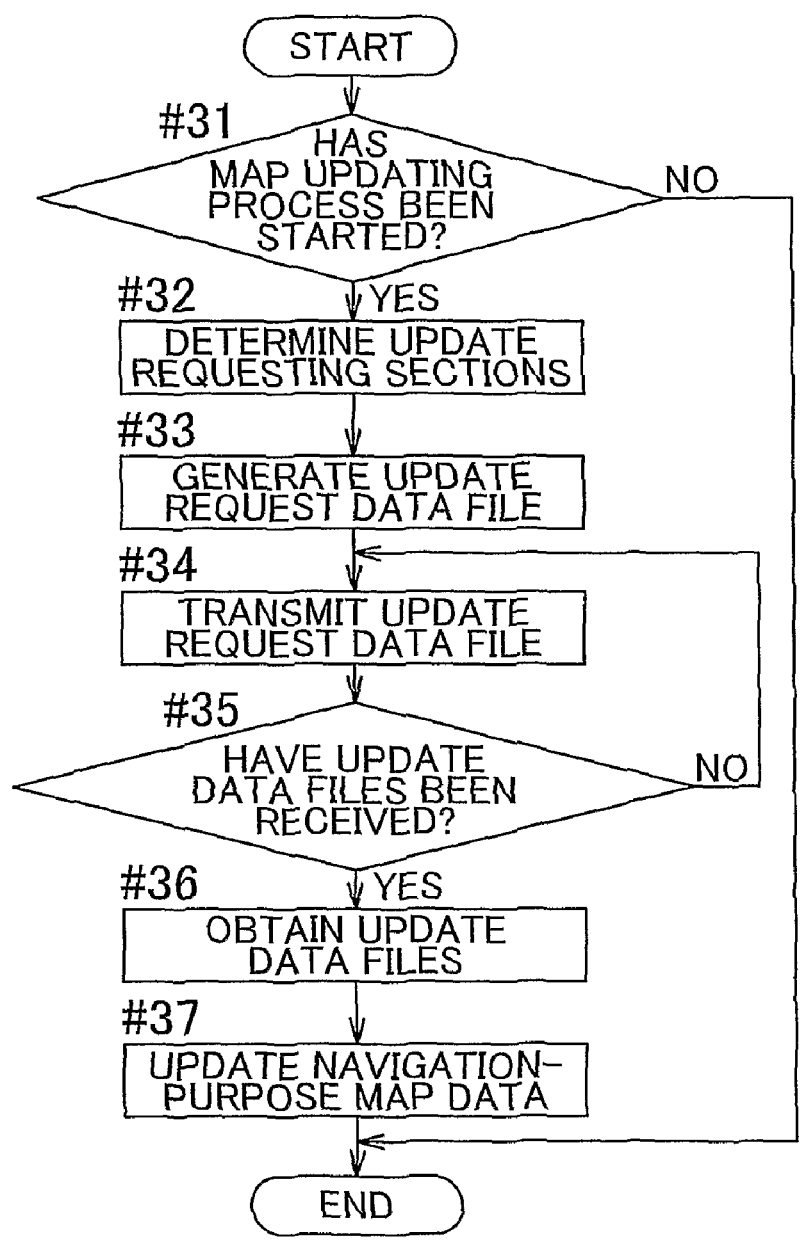
FIG. 12 is an exemplary flowchart of a method to update a map that may be performed by the navigation apparatus.

4. Operation Process Performed by the Navigation Apparatus 2 to Update the Maps Next, a procedure in the operation process performed by the navigation apparatus 2 to update the maps will be explained in detail, with reference to the flowchart in FIG. 12. As shown in FIG. 12, when the navigation-purpose map data Mb is to be updated, the navigation apparatus 2 causes the update request generating unit 28 to generate the update request data file fb and to transmit the generated update request data file fb to the map update data supplying apparatus 1. The navigation apparatus 2 then obtains the update data files fa that have been generated by the map update data supplying apparatus 1 in response to the received update request data file fb. The navigation apparatus 2 further updates the navigation-purpose map data Mb, based on the obtained update data files fa.

More specifically, as shown in FIG. 12, first, the navigation apparatus 2 judges whether or not a map updating process has been started (step #31). The map updating process is started, for example, when the navigation apparatus 2 performs a map updating process regularly with a predetermined interval period, when the navigation-purpose calculating unit 27 refers to the navigation-purpose map data Mb while a predetermined condition is satisfied, or when a user of the navigation apparatus 2 performs an operation to request that a map updating process should be started.

In a case where the map updating process has been started (step #31: Yes), the navigation apparatus 2 causes the update request generating unit 28 to determine the update requesting section pa (step #32). In this situation, the update requesting section pa may include a section p that is currently needed in the process performed by the navigation-purpose calculating unit 27 and a section that has a high possibility of being needed in the future. Thus, as explained above, the update requesting section pa corresponds to a section p that contains, for example, one or more of the following: an area around a position that is registered as the user's home; an area around a current self position detected by the self position detecting device 22; an area around a destination point; and an area around a route to a specified destination point. In the present example, one or more sections p are selected as the update requesting section pa from among the sections p in Layer 1 in the principal map data Mb1.

Next, the navigation apparatus 2 causes the update request generating unit 28 to generate the update request data file fb (step #33). In this situation, the update request data file fb is generated as a data file that includes information used for identifying each of the one or more update requesting sections pa that have been determined at step #32. The information used for identifying the one or more update requesting sections pa includes, for example, the section ID information that is used in common with the update-purpose map data Ma that is used by the map update data supplying apparatus I. After that, the navigation apparatus 2 causes the communication controlling unit 30 to control the communicating device 26 so that the update request data file fb that has been generated at step #33 is transmitted to the map update data supplying apparatus 1 (step #34). When having received the update request data file fb, the map update data supplying apparatus 1 performs the process of generating the update data files fa and transmitting the generated update data files fa to the navigation apparatus 2, as explained above. In a case where the navigation apparatus 2 is not able to receive the update data files fa from the map update data supplying apparatus 1 even after a predetermined period of time has elapsed (step #35: No), the navigation apparatus 2 judges that the communication has failed and transmits the update request data file fb again (step #34).

On the other hand, in a case where the navigation apparatus 2 has received the update data files fa from the map update data supplying apparatus 1 (step #35: Yes), the navigation apparatus 2 obtains the update data files fa (step #36) and causes the map data updating unit 29 to update the navigation-purpose map data Mb, based on the obtained update data files fa (step #37). In the present example, as explained above, each of the update data files fa is a file that contains the map data regarding the update requesting section pa or the update requiring section pb. Thus, the map data updating unit 29 updates the navigation-purpose map data Mb at step #37 by changing the map data for the section p that correspond to the update requesting section pa and the update requiring sections pb in Layer 1 in the principal map data Mb1 included in the navigation-purpose map data Mb, to the map data for the update requesting section pa and the update requiring sections pb contained in the update data files fa. As a result of the process described here, the operation process for updating the maps that is performed by the navigation apparatus 2 is completed.

Figure 13:
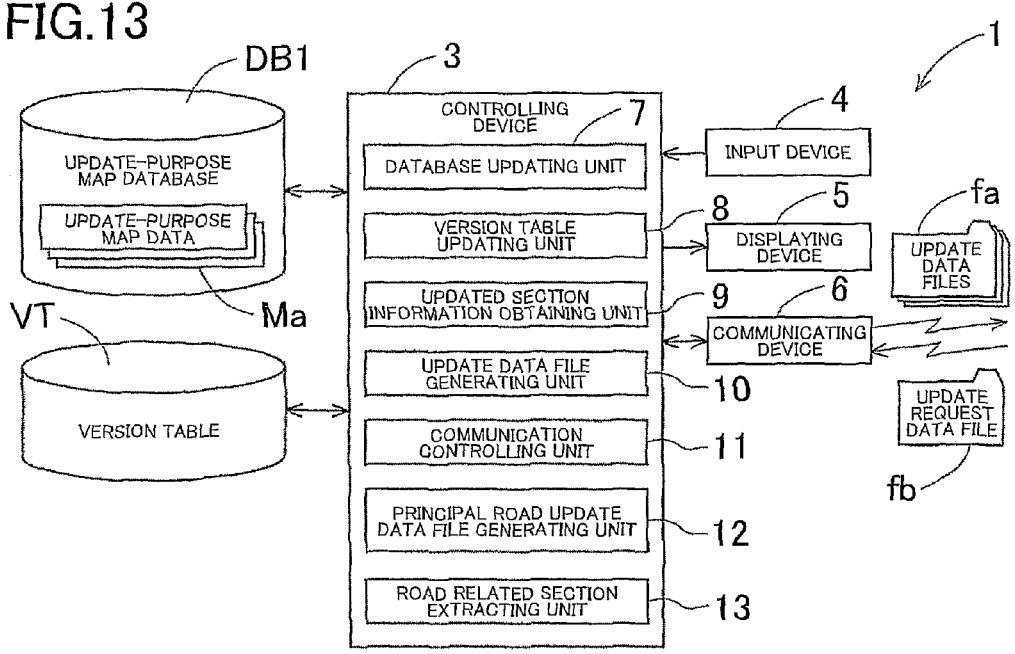
FIG. 13 is a block diagram of a second example of a map update data supplying apparatus.

Next, a another example of the present invention will be explained, with reference to the drawings. FIG. 13 is a block diagram that schematically shows an exemplary configuration of the map update data supplying apparatus 1 according to another example. As shown in FIG. 13, in addition to the configuration of the map update data supplying apparatus 1 according to the example described above, the map update data supplying apparatus 1 according to another example is configured so that the controlling device 3 includes a principal road update data file generating unit 12 and a road related section extracting unit 13. In a case where a specific principal road has been updated in the update-purpose map update data Ma, the map update data supplying apparatus 1 generates an update data file fa regarding the principal road and extracts such sections p each of which needs to be updated due to the update of the principal road, without any relation to the update requests transmitted from the navigation apparatus 2. Further, the map update data supplying apparatus 1 uses each of the extracted sections p as an update requesting section pa and treats these update requesting sections pa in the same way as the update requesting section pa is treated in the example described above. In other words, the update data supplying apparatus 1 extracts such update requiring sections pb each of which needs to be updated in order to guarantee the integrity between the sections p that are positioned adjacent to each other after each of the update requesting sections pa has been updated. The update data supplying apparatus 1 also obtains the information related to the guaranty version va for each of the update requiring sections pb. After that, the map update data supplying apparatus 1 generates update data files fa regarding the update requesting sections pa and update data files fa each having an update version indicated as the guaranty version va regarding the extracted update requiring sections pb. Also, the map update data supplying apparatus 1 transmits the generated update data files fa regarding the principal road, the update requesting sections pa, and the update requiring sections pb to the navigation apparatus 2. Other technical features of the map update data supplying apparatus 1 according to this example that are not particularly explained here are the same as those explained in the description of the example described above.

Figure 14:
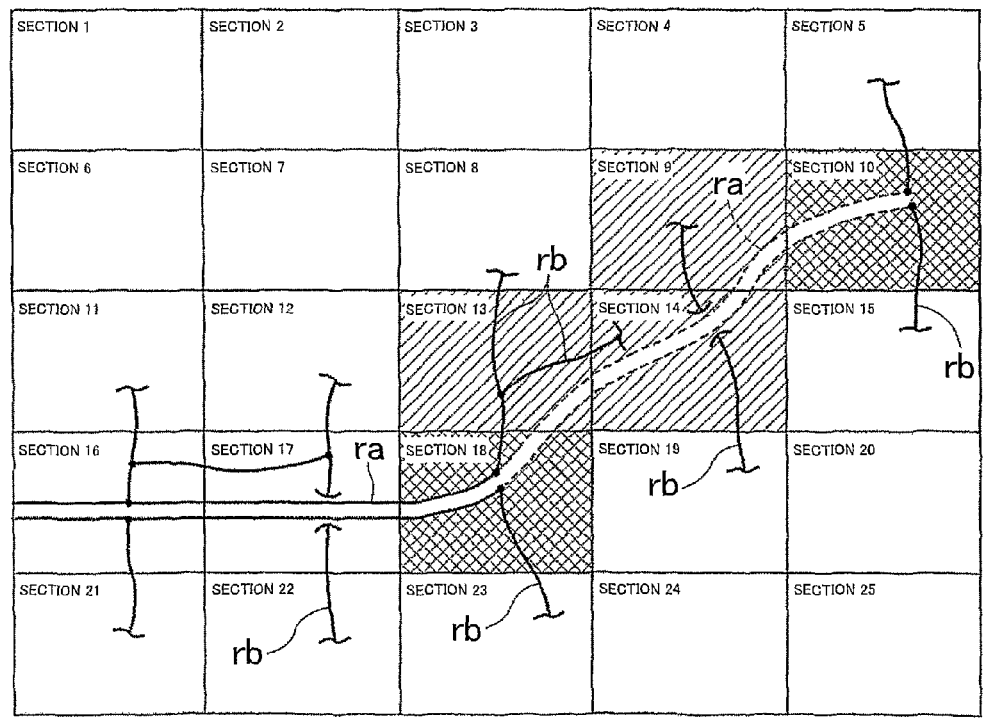
FIG. 14 is an example of a connection relationship between a specific principal road and other roads in a case where the principal road has been updated.

FIG. 14 is a drawing that shows an example of a connection relationship between a specific principal road ra and other roads rb in a case where the specific principal road ra has been updated. In the following section, the configurations of the constituent elements of the map update data supplying apparatus 1 will be explained with reference to the example shown in FIG. 14. In this example, the specific principal road ra corresponds to a principal road that has a high possibility of being referred to during a route calculation process or a route guidance process performed by the navigation-purpose calculating unit 27 included in the navigation apparatus 2. In particular, it is preferable to have an arrangement so as to use, as the specific principal road ra, a road that has a high possibility of being referred to in a process of calculating a long-distance route or providing guidance for a long-distance route, for example, an expressway or a toll road. Also, depending on the situations, it is also acceptable to use, as the specific principal road, one of national routes and major prefectural roads, in addition to expressways and toll roads.

The principal road update data file generating unit 12 is a unit that, in a case where the specific principal road ra has been updated in the update-purpose map data Ma, generates the update data file fa regarding the principal road ra, without any relation to the update requests transmitted from the navigation apparatus 2. In this situation, the principal road update data file generating unit 12 generates the update data file fa having the newest update version (Version 6 in the present example) regarding the principal road ra, based on the different versions of update-purpose map data Ma (Ma1 through Ma6) that are stored in the update-purpose map database DB1. The update data file fa regarding the principal road ra that is generated by the principal road update data file generating unit 12 is different from the update data files fa that are generated in units of sections and have been explained in the description of the first embodiment. The update data file fa regarding the principal road ra is data that is provided in units of roads and that uses only principal roads in the sections p as a target. In the present example, the update data file fa regarding the principal road ra is generated as a data file that includes the data related to the positioning and the shape of the principal road ra after the update has been performed, regarding the section p in which the principal road has been updated, as well as the information used for identifying the section p in which the update has been performed. In this situation, the information used for identifying the section p in which the update has been performed includes, for example, the section ID information that is used in common with the navigation-purpose map data Mb that is used by the navigation apparatus 2. In the example shown in FIG. 14, the update data file fa for the principal road ra regarding Sections 9, 10, 13, 14, and 18 is generated. Even if a section p contains the principal road ra that has been updated, in the case where the state of the principal road ra has not changed within the section p, no update data file fa will be generated regarding such a section (e.g., Section 16 and Section 17 in the present example).

The road related section extracting unit 13 is a unit that, in a case where the principal road ra has been updated in the update-purpose map data Ma, extracts such sections p each of which needs to be updated based on the connection relationships between the other road rb and the principal road ra within such a section p that contains the principal road ra as a feature. In the present example, the road related section extracting unit 13 is configured so as to extract, as the sections p that need to be updated, such sections p each of which contains one of the other roads rb being connected to an updated portion of the principal road ra. In the present example, as shown in FIG. 14, among Sections 1 through 25, Sections 9, 10, 13, 14, 16, 17, and 18 each contain the principal road ra. Among these sections p, Sections 9, 10, 13, 14, and 18 each contain an updated portion of the principal road ra. In the present example, Sections 10 and 18 each contain one of the other roads rb that is connected to an updated portion of the principal road ra. Accordingly, in the present example, the road related section extracting unit 13 extracts Sections 10 and 18 as the sections p that need to be updated. By configuring the road related section extracting unit 13 in this manner, it is possible to eliminate, from the targets of the updates, such sections p that are able to guarantee the integrity of the roads within the sections p even after only the principal road ra has been updated, because there is no connection relationships between the principal road ra and the other roads rb within the sections p. Thus, it is possible to promptly have the update of the principal road ra reflected in the navigation-purpose map data Mb, and to keep the data amount of the update data files fa generated by the update data file generating unit 10 (explained later), while guaranteeing the integrity between the sections after the update is performed.

Also, according to the present example, in the case where the principal road ra has been updated, the updated section information obtaining unit 9 uses each of the sections p that have been extracted by the road related section extracting unit 13 as the update requesting section pa. In other words, by using each of the sections p that have been extracted by the road related section extracting unit 13 as the update requesting section pa, the updated section information obtaining unit 9 extracts update requiring sections pb each of which needs to be updated in order to guarantee the integrity between the sections p that are positioned adjacent to each other after each update requesting section pa has been updated and further obtains the information related to the guaranty version va of each of the update requiring sections pb. The update data file generating unit 10 generates the update data files fa each having the newest update version (Version 6 in the present example) regarding the update requesting sections pa as well as the update data files fa each having the update version indicated by the guaranty version va regarding the extracted update requiring sections pb. After that, the communication controlling unit 11 controls the operation of the communicating device 6 so that the update data file fa having the newest update version regarding the principal road ra that has been generated by the principal road update data file generating unit 12 as well as the update data files fa each having the newest update version regarding the update requesting sections pa and the update data files fa each having the update version indicated as the guaranty version va regarding the update requiring sections ph that have been generated by the update data file generating unit 10 are transmitted to the navigation apparatus 2.

Having received the update data files fa that have been transmitted as described above, the navigation apparatus 2 updates the navigation-purpose map data Mb, as explained in the description of the example described above. It should be noted, however, that according to the present example, when the navigation-purpose map data Mb is updated, with the use of the update data file fa regarding the principal road ra, the map data for the entire area of each of the sections p will not be updated, but only the data of the principal road ra that is included in the map data of each of the sections p will be updated.

Figure 15:
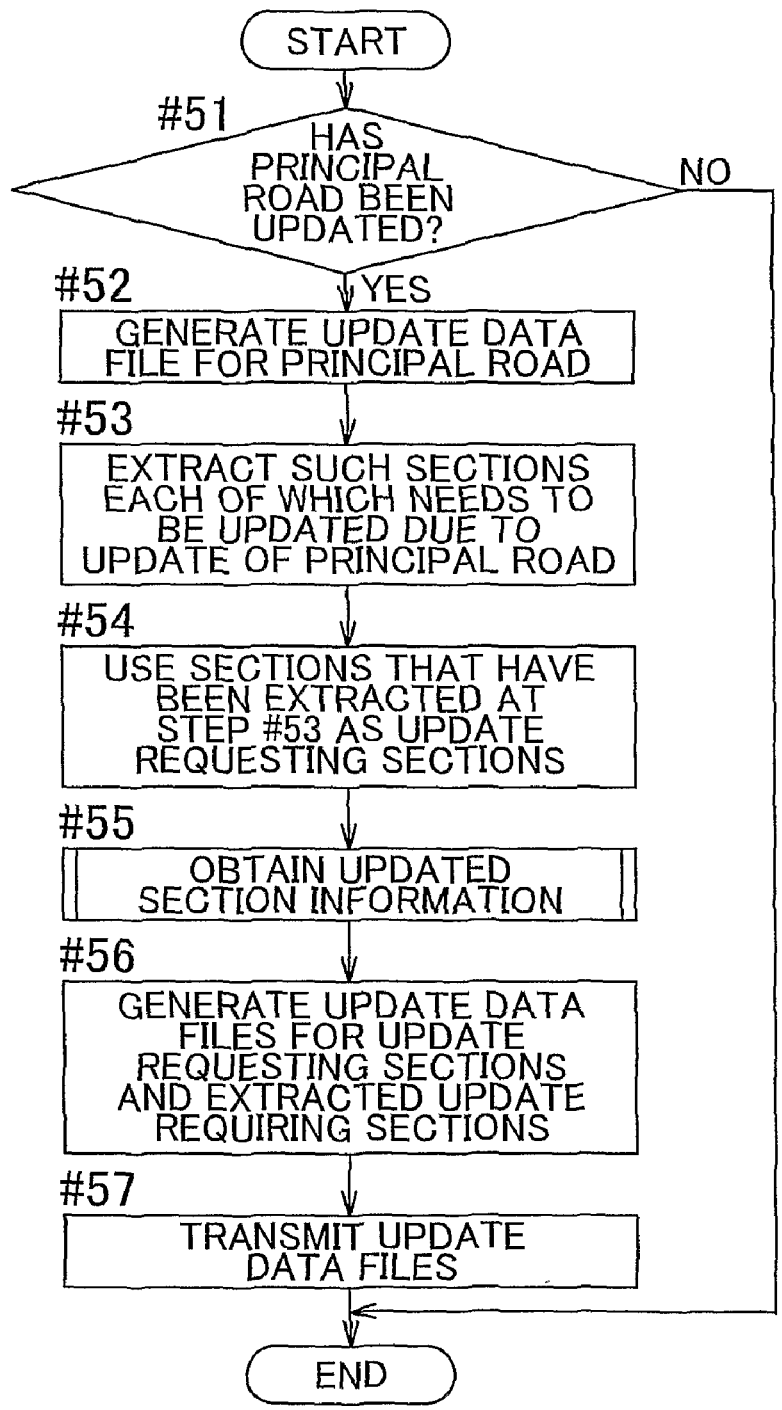
FIG. 15 is an exemplary flowchart of a method to generate and transmit an update data file in a case where a principal road has been updated.

Next, a procedure in a process performed by the map update data supplying apparatus 1 according to the present example so as to generate and transmit the update data files fa in a case where the principal road ra has been updated will be explained in detail with reference to the flowchart shown in FIG. 15. As shown in FIG. 15, in a case where a specific principal road ra has been updated in the update-purpose map data Ma (step #51: Yes), first, the map update data supplying apparatus 1 causes the principal road update data file generating unit 12 to perform a process to generate an update data file fa regarding the principal road ra (step #52). More specifically, this process is performed by, as explained above, generating the update data file fa having the newest update version for the principal road ra regarding the sections p in each of which the principal road ra has been updated, based on the different versions of update-purpose map data Ma (i.e., Ma1 through Ma6) that are stored in the update-purpose map database DBI. Next, the map update data supplying apparatus 1 causes the road related section extracting unit 13 to extract such sections p each of which needs to be updated due to the update of the principal road ra, based on the connection relationships between the other roads rb and the principal road ra within the sections p each of which contains the principal road ra as a feature (step #53). More specifically, the road related section extracting unit 13 extracts, as the sections p that need to be updated, such sections p each of which contains one of the other roads rb that is connected to an updated portion of the principal road ra. Accordingly, in the example shown in FIG. 14, Section 10 and Section 18 are extracted.

Subsequently, by using each of the sections p that have been extracted by the road related section extracting unit 13 at step #53 as an update requesting section pa (step #54), the map update data supplying apparatus 1 causes the updated section information obtaining unit 9 to perform the process of obtaining the updated section information in the same manner as explained in the description of the first embodiment (step #55). The process of obtaining the updated section information at step #55 is performed by extracting, by referring to the version table VT, the update requiring sections pb each of which needs to be updated in order to guarantee the integrity between the sections p that are positioned adjacent to each other after each update requesting section pa has been updated and further obtaining the information related to the guaranty version va of each of the extracted update requiring sections pb. Because this process has already been explained in the description of the example described above with reference to the flowchart shown in FIG. 9, further explanation will be omitted.

Subsequently, the map update data supplying apparatus 1 causes the update data file generating unit 10 to perform the process of generating the update data files fa for the update requesting sections pa and the extracted update requiring sections pb (step #56). More specifically, in this process, as shown in FIG. 3, the update data files fa each having the newest update version regarding the update requesting sections pa are generated based on the different versions of update-purpose map data Ma (i.e., Ma1 through Ma6) that are stored in the update-purpose map database DB1. In addition, in a case where one or more update requiring sections pb have been extracted at step #55, update data files fa each having an update version indicated as the guaranty version va are also generated at step #56, regarding the extracted update requiring sections pb. After that, the map update data supplying apparatus 1 causes the communication controlling unit 11 to control the communicating device 6 to transmit, to the navigation apparatus 2, the update data file fa having the newest update version regarding the principal road ra that has been generated at step #52 as well as the update data files fa each having the newest update version regarding the update requesting sections pa and the update data files fa each having the update version indicated as the guaranty version va regarding the update requiring sections pb that have been generated at step #56 (step #57). It should be noted that the process described above is performed without any relation to the update requests transmitted from the navigation apparatus 2.

(1) In the examples described above, the update-purpose map data Ma in the update-purpose map database DB 1 stores therein, as shown in FIG. 3, the map data for all the sections p that constitute the update-purpose map data Ma in correspondence with each of the update versions. However, the configuration of the update-purpose map data Ma is not limited to this example. In other words, for example, it is also acceptable to have an arrangement in which the map data is upgraded to a new version for each of the sections p that have been updated, so that data having a new update version will not be generated for the sections of which the contents have not been changed. With this arrangement, the newest update version is different for each of the sections p. As a result, it is possible to keep the data amount of the entire update-purpose map database DB1 to a small level.

(2) In the examples described above, the update data files fa is a file containing the map data for one of the sections p. However, the configuration of the update data files fa is not limited to this example. For example, it is also acceptable to have an arrangement in which each of the update data files fa contains difference data for any one of the sections p that shows the contents of a change that should be applied to the contents of pre-update navigation-purpose map data Mb. With this arrangement, it is possible to make the data amount of the files smaller than in the case where each of the update data files fa contains all the map data for the one of the sections p. When this arrangement is used, it is preferable to have an arrangement in which, the map update data supplying apparatus 1 receives, from the navigation apparatus 2, the version information related to the update requesting section pa or the update requiring section pb within the navigation-purpose map data Mb and generates the difference data by comparing the map data within the navigation-purpose map data Mb having a certain version with the map data having another version to which the map data should be updated.

(3) In the examples described above, the example is explained in which each of the update data files fa is generated for each of the sections p that is determined as an update requesting section pa or an update requiring section pb (cf. According to the second example, the update data file fa regarding the principal road ra is generated for the individual road). However, the configuration of the update data files fa is not limited to this example. It is also acceptable to have an arrangement in which the update data regarding a plurality of sections p and the principal road ra that is to be transmitted to a single navigation apparatus 2 is put together into one file.

(4) In the examples described above, the version table VT stores therein only some of the section groups g each of which is made up with two sections p that are positioned adjacent to each other. However, the configuration of the version table VT is not limited to this example. For example, it is also acceptable to have another arrangement in which the version table VT stores therein the information of all the section groups g each of which is made up of two sections p that are positioned adjacent to each other within the update-purpose map data Ma. In this situation, the version table VT also stores therein the information related to the section groups g of which the guaranty version va is "1."

(5) In the examples described above, the version table VT stores therein two section groups g that are made up of mutually the same set of two sections p, while distinguishing one section group g that uses one of the sections p as a reference from the other section group g that uses the other section p as a reference. However, the configuration of the version table VT is not limited to this example. It is acceptable to have another arrangement in which the version table VT does not store therein, in a duplicate manner, two section groups g that have mutually the same set of two sections p. With this arrangement, it is possible to keep the data amount of the version table VT to an even smaller level.

(6) In the examples described above, the map update data supplying apparatus 1 transmits the update data files fa to the navigation apparatus 2 via the communication network. However, the method for supplying the update data files fa is not limited to this example. For example, it is acceptable to have an arrangement in which the map update data supplying apparatus 1 records the update data files fa onto a predetermined recording medium by using a recording medium recording means without using the communicating unit so that the recording medium is supplied to a user of the navigation apparatus 2 by a postal service or the like. In this situation, it is acceptable to have an arrangement in which the map update data supplying apparatus 1 obtains the update request from the navigation apparatus 2, via a communication like in the exemplary embodiments above, or by using other means such as a postal service.

(7) In the examples described above, the update requiring sections pb are extracted, each of which needs to be updated in order to guarantee the integrity between the sections p that are positioned adjacent to each other after the update requesting section pa has been updated, so that the update data files fa regarding the update requesting section pa and the update requiring sections pb are generated. It is acceptable to apply this method for extracting the update requiring sections pb that is used in the examples described above to a map data updating method for directly updating a specific update requesting section within map data that is divided into a plurality of sections like the map data used by the navigation apparatus 2. More specifically, in this map data updating method, the update-purpose map database DB1 that is the same as the one described in the exemplary embodiments above is used. Also, by referring to the version table VT that is the same as the one described in the examples above, in correspondence with the section groups g each of which is a set made up of one of the sections p within the update-purpose map data Ma and another section p that is positioned adjacent thereto, an oldest update version that is able to guarantee the integrity between the sections p that constitute a corresponding one of the section groups g is determined as the guaranty version va. By using the update requesting section pa as a reference section, such section groups g are sequentially traced each of which has a relationship of which the integrity needs to be guaranteed, so that such section groups are sequentially extracted each of which has a relationship that has the same guaranty version or an older guaranty version in view of the order in which the section groups g have been traced. The sections p that constitute each of the extracted section groups g are then used as update requiring sections pb. Accordingly, the update requesting section pa and the update requiring sections pb within the map data are updated. It is preferable to have an arrangement in which the update versions of the update requesting section pa and the update requiring sections pb are determined in the same manner as in the exemplary embodiments described above.

(8) In the examples described above, the update data files fa supplied by the map update data supplying apparatus 1 use the navigation-purpose map data Mb stored in the navigation apparatus 2 as the target of the update. However, the target map data that is used as the target of the update by the update data files fa is not limited to the navigation-purpose map data Mb. It is acceptable to use any other map data having various usages as the target of the update, as long as the map data is divided into a plurality of sections.

The invention claimed is:

1. A map update data supplying apparatus supplies update data files used for updating target map data, the map update data supplying apparatus comprising:
an update-purpose map database stores a plurality of update versions of update-purpose map data, each update version of update-purpose map data being divided into a plurality of sections;
a version table stores information related to guaranty versions in correspondence with section groups, each of the section groups being a set made up of a different one of the sections in the update-purpose map data and another section that is positioned adjacent thereto, and each of the guaranty versions being an oldest update version that is able to guarantee integrity between the sections that constitute a corresponding one of the section groups; and
a controller configured to:
extract update requiring sections with respect to an update requesting section that is one of sections request requesting that the target map data be updated;
obtain the information related to the guaranty versions respectively corresponding to the extracted update requiring sections by referring to the version table, the update requiring sections each being one of the sections that needs to be updated in order to guarantee integrity between the sections that are positioned adjacent to each other after the update requesting section has been updated; and
generate, based on the update-purpose map database, one of the update data files regarding the update requesting section as well as other ones of the update data files regarding the update requiring sections and having the update versions indicated as the guaranty versions.

2. The map update data supplying apparatus according to claim 1, wherein:
the version table stores information related to the section groups each of which is the set made up of the sections containing one or more features that are located so as to extend over the sections that are positioned adjacent to each other; and
the information related to the guaranty versions that is stored in correspondence with the section groups is information that indicates the update versions, each of which is an update version that is used when a newest feature among the one or more features appears for the first time in the update-purpose map data.

3. The map update data supplying apparatus according to claim 1, wherein:
the controller is configured to extract, as the update requiring sections, such sections each of which contain a feature located so as to extend over the sections that are positioned adjacent to each other and each of which need to be updated in order to guarantee a connection relationship of the feature at a border between the sections that are positioned adjacent to each other after the update requesting section has been updated.

4. The map update data supplying apparatus according to claim 1, wherein:
by referring to the version table, the controller is configured to extract such a section that constitutes a section group by being combined with the update requesting section and determines the guaranty version of the section group that is made up of the extracted section and the update requesting section as the guaranty version of the extracted section;
(i) by using the extracted section as a reference section, the controller is configured to extract such a section that constitutes a section group including the reference section and having a guaranty version that is same as or older than the guaranty version of the reference section, (ii) determines the guaranty version of the section group that is made up of the extracted section and the reference section as the guaranty version of the extracted section and uses the extracted section as a reference section, the controller is configured to repeat (i) and (ii) until there is no more section group having a guaranty version that is same as or older than the guaranty version of the reference section; and
the extracted sections are used as the update requiring sections, and the guaranty version of each of the extracted sections is determined as the guaranty version of a corresponding one of the update requiring sections.

5. The map update data supplying apparatus according to claim 1, wherein the controller is configured to:
generates, in a case where a specific principal road has been updated in the update-purpose map data, an update data file regarding the specific principal road;
extracts, in the case where the specific principal road has been updated, a section that needs to be updated, based on a connection relationship between another road and the specific principal road within such a section that contains the specific principal road as a feature; and
in the case where the specific principal road has been updated, uses the section extracted by the road related section extracting unit as the update requesting section.

6. The map update data supplying apparatus according to claim 5, wherein:
the controller is configured to extract such a section that contains the other road connected to an updated portion of the specific principal road as the section that needs to be updated.

7. A map data updating system comprising:
the map update data supplying apparatus according to claim 1; and
a navigation apparatus, the navigation apparatus including:
a navigation-purpose map database that stores navigation-purpose map data that serves as the target map data and is divided into a plurality of sections; and
a controller configured to:
generates an update request data file regarding the update requesting section;
obtains the update data files supplied by the map update data supplying apparatus; and
updates the navigation-purpose map data, based on the obtained update data files.

8. A map update data supplying method for supplying update data files used for updating target map data, comprising:
storing in an update-purpose map database that stores a plurality of update versions of update-purpose map data, each update version of update-purpose map data being divided into a plurality of sections,
determining guaranty versions in correspondence with section groups, each of the section groups being a set made up of a different one of the sections in the update-purpose map data and another section that is positioned adjacent thereto, and each of the guaranty versions being an oldest update version that is able to guarantee integrity between the sections that constitute a corresponding one of the section groups extracting update requiring sections with respect to an update requesting section that is one of sections request requesting that the target map data be updated;

obtaining information related to guaranty versions respectively corresponding to the extracted update requiring sections, the update requiring sections each being one of the sections that needs to be updated in order to guarantee integrity between the sections that are positioned adjacent to each other after the update requesting section has been updated;

generating, based on the update-purpose map database, one of the update data files regarding the update requesting section as well as other ones of the update data files regarding the update requiring sections extracted at the updated section information obtaining step and having the update versions indicated as the guaranty versions; and supplying the generated update data files.

9. The map update data supplying method according to claim 8, further comprising:

extracting a section that constitutes a section group by being combined with the update requesting section, so that the guaranty version of the section group that is made up of the extracted section and the update requesting section is determined as the guaranty version of the extracted section;

(i) extracting a section that constitutes a section group including the reference section and having a guaranty version that is same as or older than the guaranty version of the reference section by using the extracted section as a reference section, and (ii) determining the guaranty version of the section group that is made up of the extracted section and the reference section as the guaranty version of the extracted section, and the extracted section is now used as a reference section, and repeating (i) and (ii) until there is no more section group having a guaranty version that is same as or older than the guaranty version of the reference section;

using the extracted sections as the update requiring sections; and determining the guaranty version of each of the extracted sections as the guaranty version of a corresponding one of the update requiring sections.

10. The map update data supplying method according to claim 8, further comprising:

in a case where a specific principal road has been updated, a principal road update data file generating step and a road related section extracting step are performed before the updated section information obtaining step is performed, wherein generating step an update data file regarding the specific principal in a case where a specific principal road has been updated;

extracting a section that needs to be updated based on a connection relationship between another road and the specific principal road within such a section that contains the specific principal road as a feature in a case where a specific principal road has been updated; wherein:

the section that has been extracted is used as the update requesting section.

* * * * *